United States Patent
Bardia

(10) Patent No.: US 9,528,498 B2
(45) Date of Patent: Dec. 27, 2016

(54) ON OR OFF GRID VERTICAL AXIS WIND TURBINE AND SELF CONTAINED RAPID DEPLOYMENT AUTONOOUS BATTLEFIELD ROBOT RECHARGING AND FORWARD OPERATING BASE HORIZONTAL AXIS WIND TURBINE

(71) Applicant: Jaime Miguel Bardia, Greenwich, CT (US)

(72) Inventor: Jaime Miguel Bardia, Greenwich, CT (US)

( * ) Notice: Subject to any disclaimer, the term of this patent is extended or adjusted under 35 U.S.C. 154(b) by 10 days.

(21) Appl. No.: 14/807,556

(22) Filed: Jul. 23, 2015

(65) Prior Publication Data

US 2015/0345473 A1 Dec. 3, 2015

Related U.S. Application Data

(63) Continuation-in-part of application No. 14/025,204, filed on Sep. 12, 2013, now Pat. No. 9,103,321.

(Continued)

(51) Int. Cl.

| | |
|---|---|
| *F03D 9/00* | (2016.01) |
| *H02P 9/04* | (2006.01) |
| *F03D 3/00* | (2006.01) |
| *H02K 7/114* | (2006.01) |
| *H02K 7/102* | (2006.01) |

(Continued)

(52) U.S. Cl.
CPC ............. *F03D 9/002* (2013.01); *F03D 3/005* (2013.01); *F03D 9/007* (2013.01); *F03D 13/20* (2016.05); *H02K 7/102* (2013.01); *H02K 7/114* (2013.01); *H02K 7/183* (2013.01); *H02K 9/04* (2013.01); *H02P 9/06* (2013.01); *F05B 2240/212* (2013.01); *F05B 2240/50* (2013.01); *F05B 2240/9151* (2013.01); *F05B 2240/94* (2013.01); *Y02E 10/728* (2013.01); *Y02E 10/74* (2013.01)

(58) Field of Classification Search
USPC ....................................................... 290/44, 55
See application file for complete search history.

(56) References Cited

U.S. PATENT DOCUMENTS

| 2,106,928 A | 2/1938 | Lee | |
|---|---|---|---|
| 4,151,534 A * | 4/1979 | Bond | H01Q 1/1235 343/883 |

(Continued)

FOREIGN PATENT DOCUMENTS

| EP | 2667024 A1 | 11/2013 | |
|---|---|---|---|
| JP | 2014095318 A * | 5/2014 | ............. F03D 11/00 |

(Continued)

*Primary Examiner* — Pedro J Cuevas
(74) *Attorney, Agent, or Firm* — Hess Patent Law Firm; Robert J. Hess

(57) ABSTRACT

Vertical axis wind turbine and horizontal wind turbine each with a rotary airfoil assembly that has helical swept airfoils whose free ends each have a spoiler. The vertical axis wind turbine has permanent magnet discs for levitating static weight of an entirety of the rotary airfoil assembly via magnetic repulsion. There is a hub or affixing the permanent magnet discs within a frame structure in a manner that counteracts both a coefficient of friction ("COF") associated with rotation of the rotary airfoil assembly and ensuing bearing wear imparted from the rotary airfoil assembly. The horizontal axis wind turbine has collapsible telescoping towers.

25 Claims, 26 Drawing Sheets

Related U.S. Application Data

(60) Provisional application No. 61/700,820, filed on Sep. 13, 2012.

(51) Int. Cl.
*H02K 7/18* (2006.01)
*H02P 9/06* (2006.01)
*H02K 9/04* (2006.01)

(56) References Cited

U.S. PATENT DOCUMENTS

| | | | |
|---|---|---|---|
| 4,236,866 A | 12/1980 | Zapata Martinez | |
| 4,293,274 A | 10/1981 | Gilman | |
| 4,464,579 A | 8/1984 | Schwarz | |
| 4,490,093 A | 12/1984 | Chertok et al. | |
| 4,514,145 A | 4/1985 | Wood | |
| 4,575,311 A | 3/1986 | Wood | |
| 5,057,696 A | 10/1991 | Thomas | |
| 5,101,215 A * | 3/1992 | Creaser, Jr. | E04H 12/182 343/883 |
| 5,332,925 A | 7/1994 | Thomas | |
| 5,405,246 A | 4/1995 | Goldberg | |
| 5,570,859 A | 11/1996 | Quandt | |
| 6,037,876 A * | 3/2000 | Crouch | G09F 9/33 340/815.53 |
| 6,172,429 B1 | 1/2001 | Russell | |
| 6,492,963 B1 * | 12/2002 | Hoch | B62J 6/20 340/432 |
| 6,856,303 B2 * | 2/2005 | Kowalewski | G09G 3/005 345/108 |
| 7,045,702 B2 * | 5/2006 | Kashyap | F03D 9/007 136/244 |
| 7,161,256 B2 * | 1/2007 | Fang | H02K 7/1807 290/1 R |
| 7,477,208 B2 * | 1/2009 | Matlock | G09G 3/005 345/110 |
| 7,574,832 B1 * | 8/2009 | Lieberman | E04H 12/10 212/350 |
| 8,109,814 B2 * | 2/2012 | Uchino | F03D 80/00 290/44 |
| 8,338,977 B2 | 12/2012 | Lee | |
| 8,354,757 B2 | 1/2013 | Lee | |
| 8,365,471 B2 * | 2/2013 | Diniz | E04H 9/16 340/601 |
| 8,411,108 B2 * | 4/2013 | Gilbert | B60K 35/00 345/619 |
| 8,413,390 B2 * | 4/2013 | Pereira | E04H 12/00 343/883 |
| 8,511,989 B2 * | 8/2013 | Matsushita | F03D 80/00 290/44 |
| 8,601,804 B2 * | 12/2013 | Akashi | F03D 9/001 60/398 |
| 8,632,303 B2 * | 1/2014 | Akashi | F03D 80/00 415/108 |
| 8,674,571 B2 | 3/2014 | Lee | |
| 8,684,682 B2 * | 4/2014 | Akashi | F28D 1/022 415/178 |
| 8,733,963 B2 * | 5/2014 | Sharpley | B60P 3/18 362/183 |
| 8,959,870 B2 * | 2/2015 | Schmidt | E04H 12/182 52/115 |
| 9,103,321 B1 * | 8/2015 | Bardia | F03D 9/002 |
| 9,190,028 B2 * | 11/2015 | Gilbert | B60K 35/00 |
| 9,428,100 B2 * | 8/2016 | Sharpley | B60P 3/18 |
| 2002/0135541 A1 * | 9/2002 | Kowalewski | G09G 3/005 345/31 |
| 2003/0071004 A1 * | 4/2003 | Higgins | B66C 23/701 212/292 |
| 2003/0230333 A1 * | 12/2003 | Kashyap | F03D 9/007 136/243 |
| 2004/0061337 A1 | 4/2004 | Becker | |
| 2004/0105256 A1 * | 6/2004 | Jones | A63H 33/22 362/159 |
| 2004/0183696 A1 * | 9/2004 | Low | G01C 23/00 340/945 |
| 2005/0174308 A1 * | 8/2005 | Matlock | G09G 3/005 345/82 |
| 2009/0145056 A1 * | 6/2009 | Pereira | E04H 12/00 52/111 |
| 2010/0066088 A1 * | 3/2010 | Matsushita | F03D 80/00 290/44 |
| 2010/0097448 A1 * | 4/2010 | Gilbert | B60K 35/00 348/51 |
| 2010/0127502 A1 * | 5/2010 | Uchino | F03D 80/00 290/55 |
| 2010/0229473 A1 * | 9/2010 | Simpson | E04H 12/182 52/111 |
| 2010/0232148 A1 * | 9/2010 | Sharpley | B60P 3/18 362/183 |
| 2011/0185647 A1 * | 8/2011 | Diniz | E04H 9/16 52/111 |
| 2012/0045345 A1 * | 2/2012 | Horton, III | F03D 1/001 416/244 R |
| 2012/0124984 A1 * | 5/2012 | Akashi | F03D 9/001 60/398 |
| 2012/0148407 A1 * | 6/2012 | Akashi | F03D 80/00 416/95 |
| 2012/0213592 A1 * | 8/2012 | Nowlin | E02D 27/52 405/224 |
| 2012/0257970 A1 * | 10/2012 | Akashi | F28D 1/022 416/95 |
| 2013/0091784 A1 * | 4/2013 | Schmidt | E04H 12/182 52/115 |
| 2013/0187921 A1 * | 7/2013 | Gilbert | B60K 35/00 345/426 |
| 2014/0211490 A1 * | 7/2014 | Sharpley | B60P 3/18 362/485 |
| 2015/0233353 A1 * | 8/2015 | Bertony | F03D 7/06 416/146 R |
| 2015/0361965 A1 * | 12/2015 | Jimeno Chueca | F03D 1/001 405/200 |
| 2016/0084226 A1 * | 3/2016 | Eriksen | F03D 9/002 290/55 |
| 2016/0140936 A1 * | 5/2016 | Gilbert | B60K 35/00 345/419 |
| 2016/0258601 A1 * | 9/2016 | Gowanlock | F21V 15/04 |

FOREIGN PATENT DOCUMENTS

| | | |
|---|---|---|
| RU | 123850 U1 | 1/2013 |
| RU | 2546892 C1 | 4/2015 |
| WO | WO 2014/179631 A1 | 11/2014 |

* cited by examiner

ON OR OFF GRID VERTICAL AXIS WIND TURBINE AND SELF CONTAINED RAPID DEPLOYMENT AUTONOOUS BATTLEFIELD ROBOT RECHARGING AND FORWARD OPERATING BASE HORIZONTAL AXIS WIND TURBINE

CROSS-REFERENCE TO COPENDING PATENT APPLICATIONS

The present application is a continuation-in-part of U.S. patent application Ser. No. 14/025,204 filed Sep. 12, 2013, which in turn has the benefit of priority from provisional patent application Ser. No. 61/700,820 filed Sep. 13, 2012.

BACKGROUND OF THE INVENTION

Field of the Invention

The present invention relates to an off or on grid wind turbine for capturing and maximizing dissimilar airflow(s) through a series of magnetically levitated helical variable geometry asymmetrical airfoils. The airfoils multiply the resultant rotational force into kinetic energy, thereby creating the torque required to rotate a mechanical drive system composed of individually activate alternators. This creates 36 kW or more of onsite electricity.

The present invention also relates to a retractable wind turbine tower to supply renewable electricity. The tower is equipped with redundant generators, AC & DC distribution and electrical control systems, robot charging pads, hydraulic deployment and mechanical drive systems and deployable off road capable chassis.

Description of Related Art

The present inventor considers Vertical Axis Wind Turbines (VAWTs) to suffer from inherent performance disadvantages that result from physical stress limitation and variations in wind velocity. The common shortcoming of VAWTs is the need for guy wires, resistance to self-starting (that is, high coefficient of drag), high bearing loads, limited over-speed control and the lack of destructive vibration dampening. It is desired to overcome these inherent problems with VAWTs.

SUMMARY OF THE INVENTION

Various aspects of the present invention relate to a self-supporting structure without the need for guy wires, a magnetic repulsion levitated rotary airfoil hub, a relatively low friction bearing hub, helical swept airfoils, a centrifugal force deployed leading edge slat, a centrifugal force deployed trailing edge flap, a boundary layer fence for self-starting, a centrifugal force deployed boundary layer spoiler, a centrifugal runaway brake, a self ventilating centrifugal brake shoe backing plate, an ECM controlled 6 speed transmission with a low pressure dry sump lubrication system and a separate ECM controlled high pressure hydraulic speed control with a failsafe centrifugal force deployed mechanical apparatus, an ECM input magnetically engaged conical dog clutch drive shaft engagement, an ECM input magnetic clutch generator engagement, multiple alternators, a linear/vertically stacked/progressive/switchable/alternators, ECM controlled mounts, an electronic control module, power takeoff, thermal control and a programmable 360 degree illuminated stationary sign on a variable speed rotary device.

Further aspects of the invention relate to the supply of renewable electricity to a forward battlefield operations base and a platform for autonomous robots to automatically recharge via permanently affixed charging pads. The supply of renewable electricity is from a wind turbine equipped with redundant generators, AC & DC distribution and electrical control systems, robot charging pads, hydraulic deployment and mechanical drive systems.

BRIEF DESCRIPTION OF THE DRAWING

For a better understanding of the present invention, reference is made to the following description and accompanying drawings, while the scope of the invention is set forth in the appended claims.

DESCRIPTION OF THE PREFERRED EMBODIMENT

Vertical Axis Wind Turbine

Figure 1A:
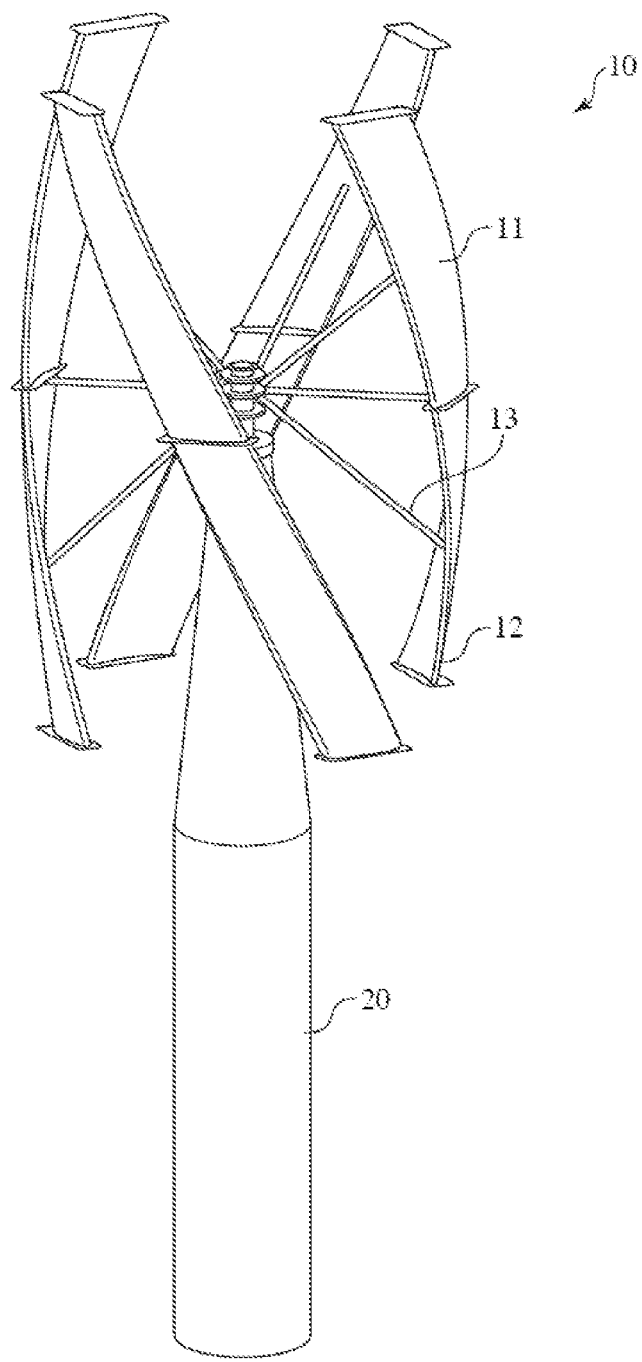
FIGS. 1A and 1B are isometric views of a vertical axis wind turbine in accordance with the invention.
Figure 1B:
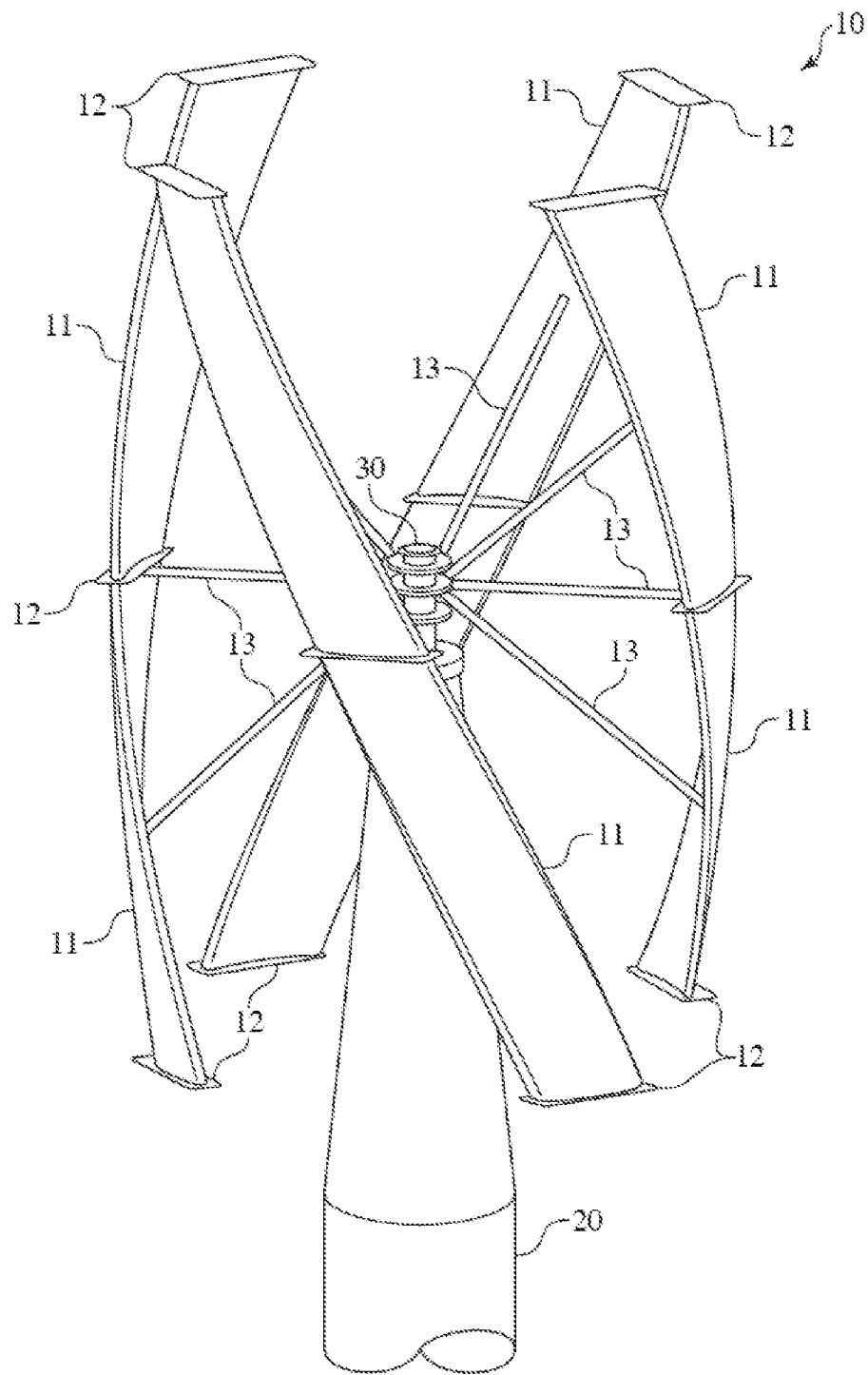

Turning to the drawings, FIGS. 1A, 1B, 2, 3A, 3B, 4A through 4D show structural components of a vertical axis wind turbine 10 (FIG. 1) in accordance with an embodiments of the invention. The components include helical swept airfoils 11 (FIGS. 1A and 1B) with a series of boundary fences 12 at their ends and toward the middle. A conical tower 20 tapers toward the top where it supports in a rotatable manner via a magnetic repulsion levitated rotary airfoil hub 30 rods 13 that connect to each of the helical swept airfoils 11.

Conical Tower Frame Assembly that Supports Components

Turning to FIGS. 3A through 4D, a self-standing structural frame 40 is within the conical tower 20 and includes an upper frame 42 and a lower frame 41. The upper frame 42 may be pyramidal or conical in its shape and lower frame 41 may be rectangular or cylindrical in its shape. While the lower frame 41 is initially empty (FIG. 4A), it will subsequently support various components that are placed within it confines.

Figure 4A:
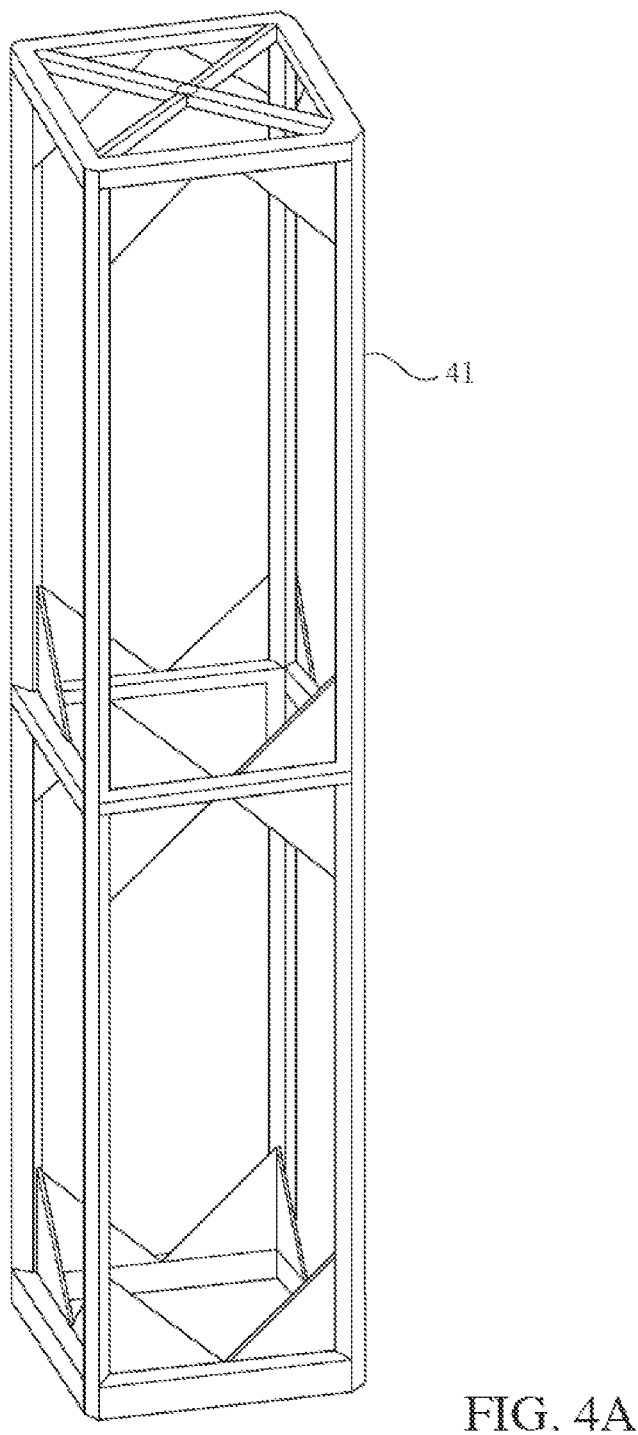
FIG. 4A is an isometric view of a lower frame of FIG. 3A that is empty.
Figure 4B:
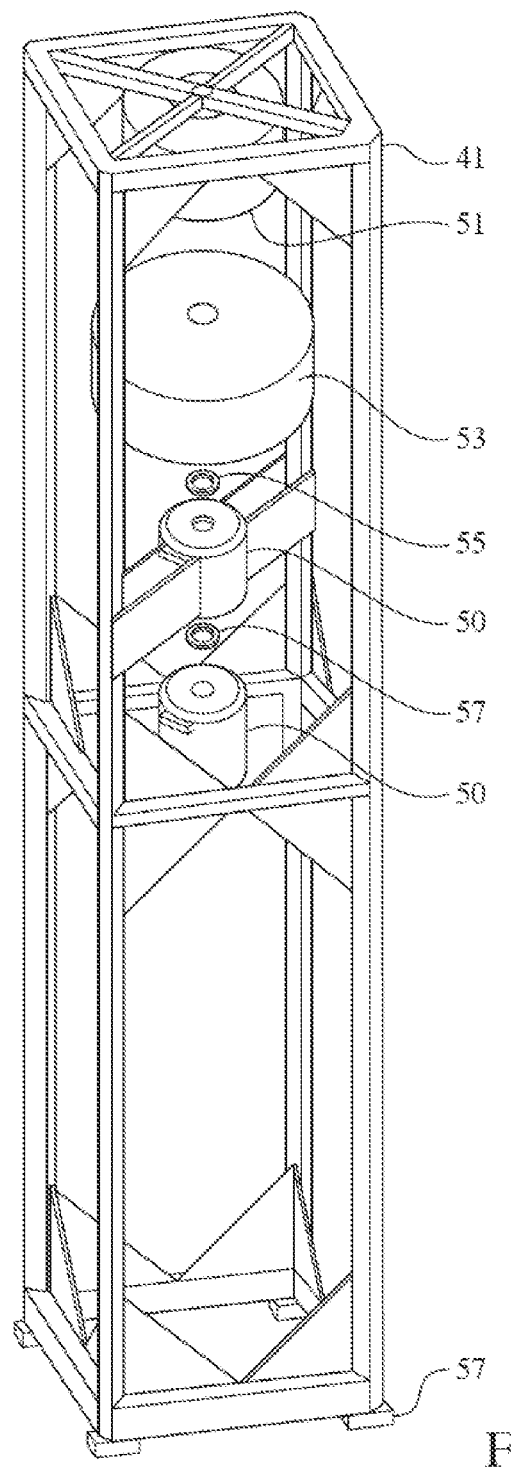
FIG. 4B is an isometric view of the lower frame of FIG. 4A but supporting components.

FIG. 4B depicts the lower frame 41 supporting a drum 51 containing a C-brake above the top of a transmission 53. Below the transmission 53 is shown a ring 55 denoting the location of an overdriven axial fan 132 (FIG. 4E) and beneath that an electromagnetic clutch. Alternators 50 or generators are stacked one above the other and beneath each is shown a further ring 57 that designates the location for another overdriven axial fan and beneath that another electromagnetic clutch. Both the overdriven axial fan 132 (FIG. 4E) and the electromagnetic clutch are conventional. Above the lower frame 41 is mounted a junction hub on which is mounted (via bolts) a radial fan 130 (FIG. 4E) for dispersing the airflow from the overdriven axial fans in a direction perpendicular to the direction of airflow from the overdriven axial fans. In the context of FIG. 4B, the overdriven axial fans 132 (FIG. 4E) blow air vertically through the alternators/generators to remove their heat and the radial fan 132 (FIG. 4E) receives the vertical airflow to turn the airflow to flow horizontally, i.e., essentially perpendicular from the direction before. The radial fan 132 is within the conical portion of the conical tower 20. The over driven axial fans are attached to the main shaft below each of the alternators 50 or generators.

There are four magnetorheological mounts 57 under the four lower corners of the frame 41. Each mount is rubber that has a cavity containing a magnetorheological fluid, which is conventional and is essential oil with iron filings that responds to the application of electrical signals from an electronic control module to isolate harmonics from affecting the mounting surfaces to which the mounts are mounted. Sensors are provided to send signals regarding vibrations and velocity to the electronic control module, which interprets those signals to determine the appropriate action to take to counter their passage through the magnetorheological mounts 57 by causing the magnetorheological fluid respond accordingly.

Figure 4C:
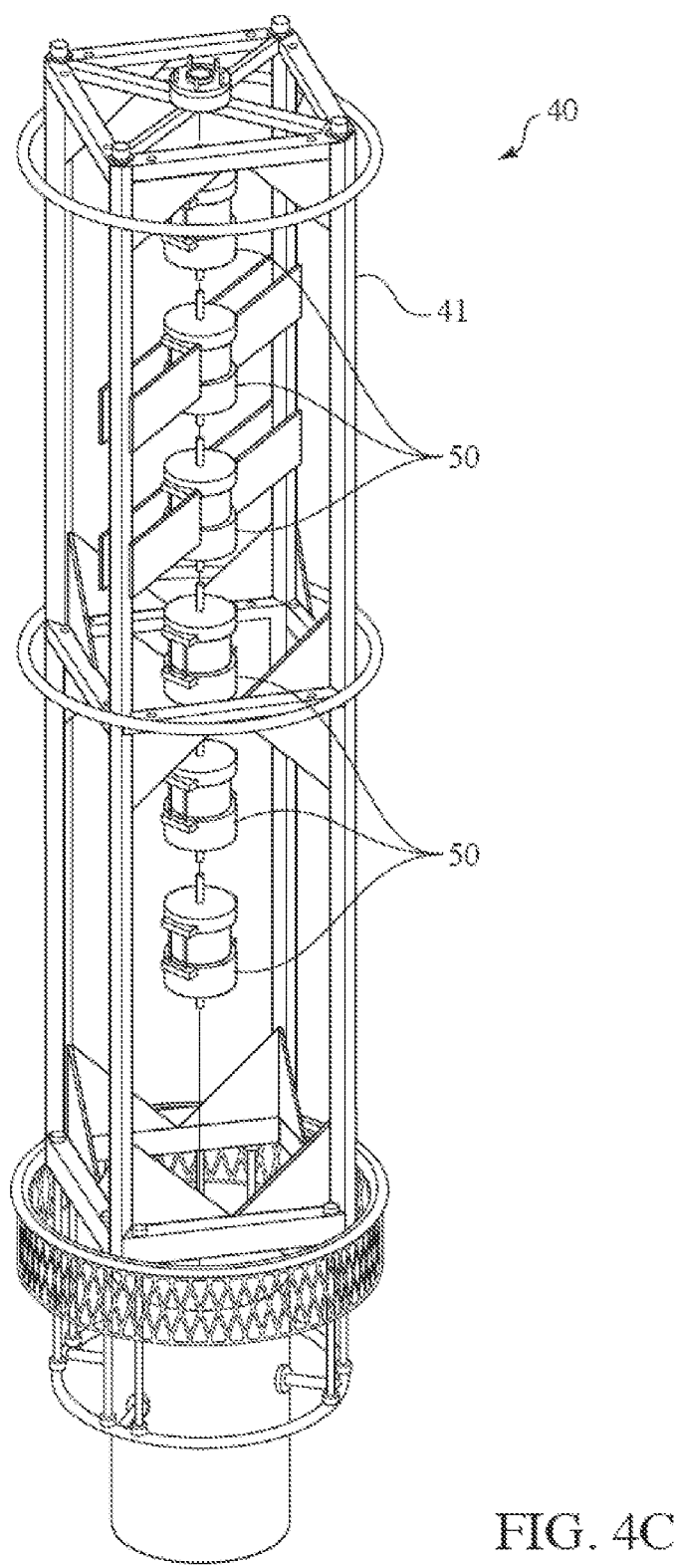
FIG. 4C is an isometric view of the lower frame of FIG. 4A with alternators stacked one over the other in position within the ground level assembly.
Figure 4D:
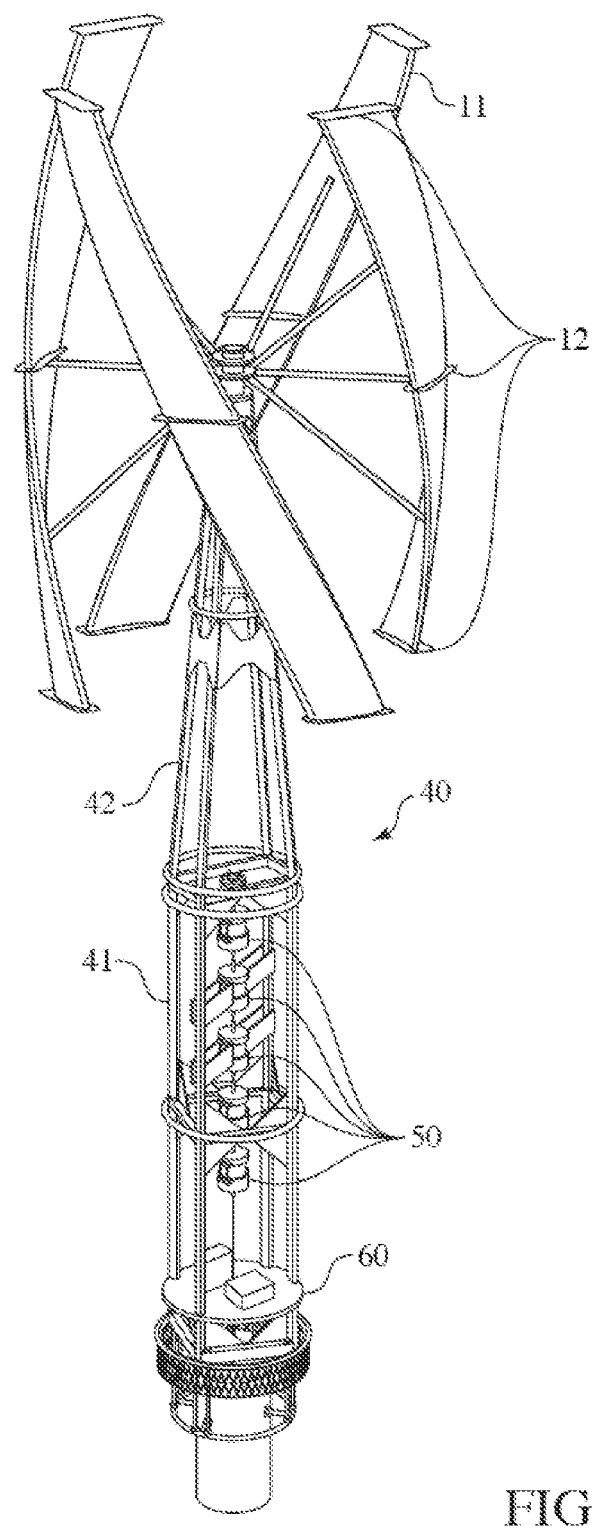
FIG. 4D is an isometric view of the self-standing frame of FIG. 3A that includes the lower frame of FIGS. 4A-4C that supports, at the top, the magnetic repulsion levitated rotary airfoil hub of FIG. 2, which is in turn supporting helical swept airfoils.
Figure 4E:
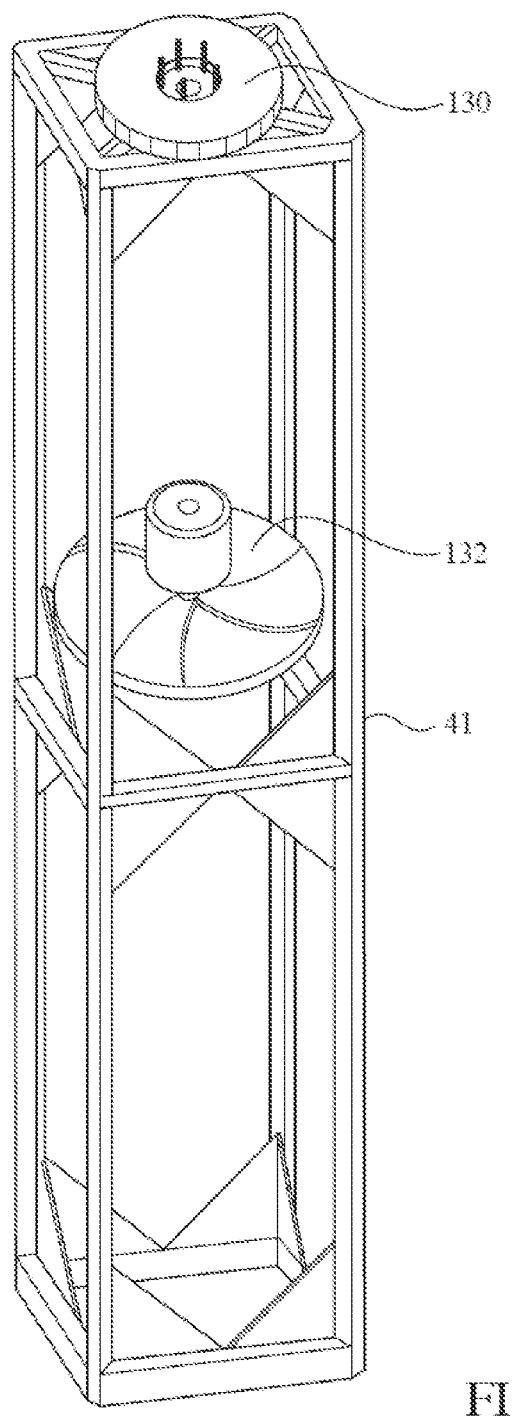
FIG. 4E is an isometric view of the lower frame of FIG. 4A supporting a radial fan and an axial fan.

The magnetic repulsion levitated rotary airfoil hub 30 (FIG. 2) is supported atop the upper frame 42 of the self-standing structural frame 40 (FIG. 3A), 45 (FIG. 3B) that is within the conical tower 20. Within the self-standing structural frame 40 are supported the alternators 50 or generators stacked one over the other on driveshaft sections and, at the base, an electronic control module 60 (FIG. 4C). The driveshaft sections may be aligned axially with each other.

Figure 2:
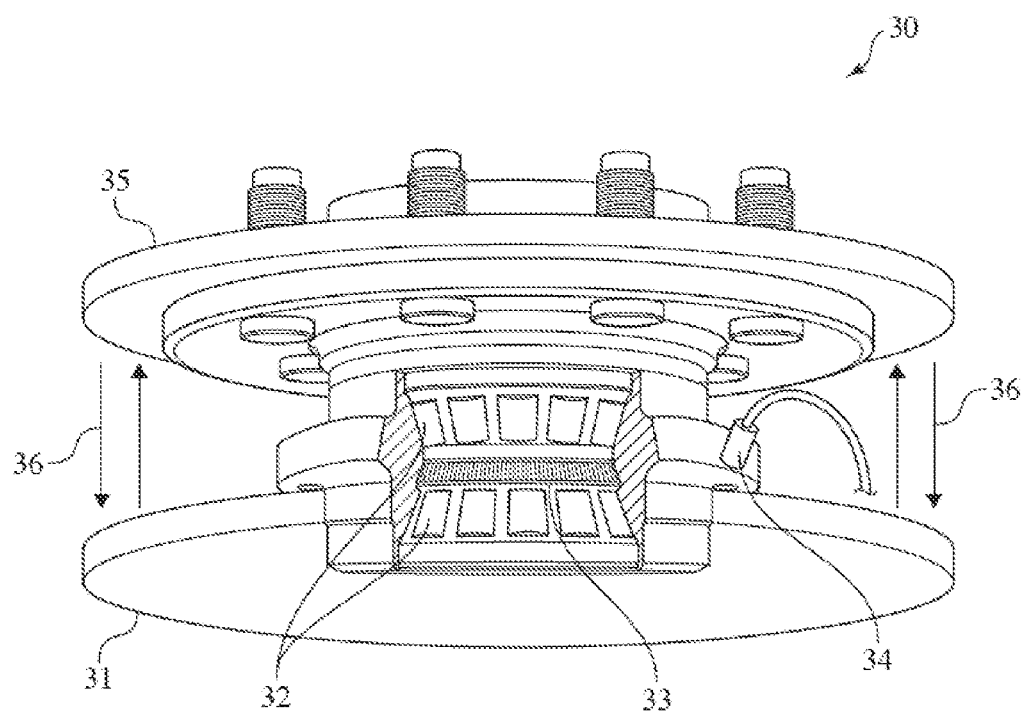
FIG. 2 is an isometric view of a magnetic repulsion levitated rotary airfoil hub.
Figure 3A:
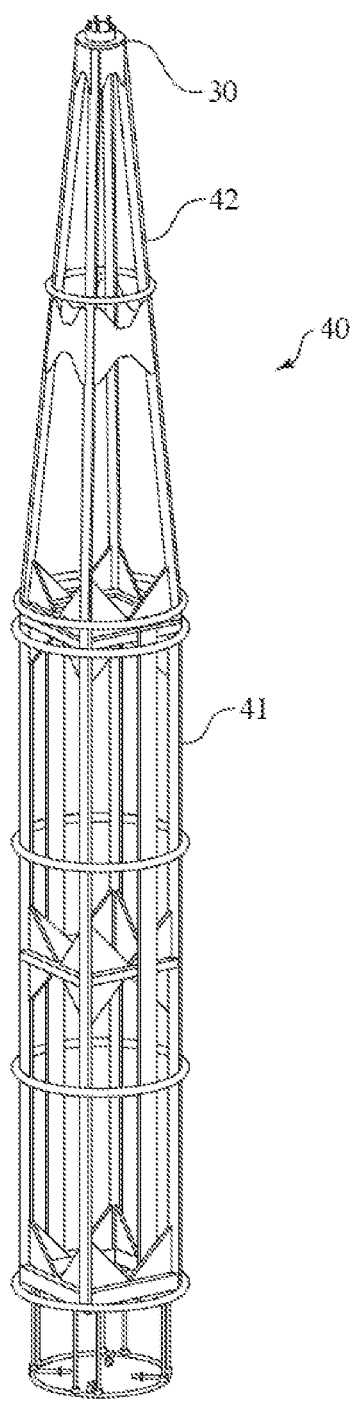
FIGS. 3A and 3B are isometric views of alternative self-standing frames of the vertical axis wind turbine of FIG. 1 that supports, at the top, the magnetic repulsion levitated rotary airfoil hub of FIG. 2.
Figure 3B:
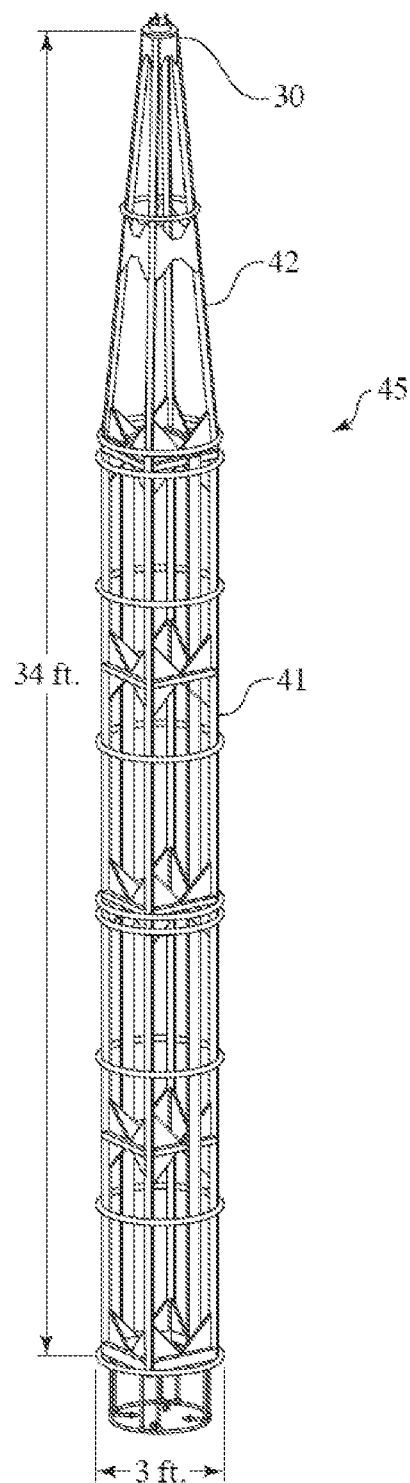

The magnetic repulsion levitated rotary airfoil hub 30 of FIG. 2 includes two rare earth ring magnets 31, 35 and two opposing conical bearings 32 separated from each other by a hall effect ring 33. A hall effect sensor 34 is provided to sense the magnetic field created by magnetic repulsion 36 between the two rare earth ring magnets and to measure current from which the velocity of the rotation of the helical swept airfoils can be determined by the electronic control module 60.

The Hall effect sensor 34 is conventional, being a transducer that varies its output voltage in response to a magnetic field. Hall effect sensors are used for proximity switching, positioning, speed detection, and current sensing applications. In its simplest form, the sensor operates as an analog transducer, directly returning a voltage. With a known magnetic field, its distance from the Hall plate can be determined. Using groups of sensors, the relative position of the magnet can be deduced. Electricity carried through a conductor will produce a magnetic field that varies with current, and a Hall sensor can be used to measure the current without interrupting the circuit. Typically, the sensor is integrated with a wound core or permanent magnet that surrounds the conductor to be measured.

Self-Supporting without Guy Wires

The self-supporting structural frame 40 (FIG. 3A), 45 (FIG. 3B) does not require guy wires to be self-supporting. The wind turbine 10 is supported via the self-supporting structural frame 40, 45 that serves as a skeletal frame that transfers the lateral torsion buckling load of the housing, conical tower 20, thrust of the rotary airfoil assembly (helical swept airfoils 11) and lateral wind loads in a steel reinforced concrete foundation (not shown in the drawings) into which is supported the bottom of the skeletal frame.

Self-Starting

The following components of the wind turbine assist in self-starting of the wind turbine. The components are:

(1) A rotary airfoil hub that is magnetic repulsion levitated (self-starting). A permanent magnet stand-off disc forms the base of the rotary airfoil hub that utilizes magnetic repulsion from an identically polarized (North and North polarity), stationary, permanent magnet stand-off disc. The disc is affixed to the conical tower in order to levitate the static weight of the entire rotary airfoil assembly. That is, the disc is affixed via a low friction bearing hub to counteract both the high coefficient of friction ("COF") associated with VAWTs and the ensuing bearing wear that results from rotary airfoil vertical stack loading commonly imparted on VAWTs.

(2) The magnetic repulsion levitated rotary airfoil hub 30 of FIG. 2 is a relatively low friction bearing hub (self-starting) to reduce the COF further and is integrated into the wind turbine. The relatively low friction bearing hub contains double opposing conical needle bearings 32 with a toothed ring (hall effect ring 33) and electronic inductive pickup (hall effect sensor 34) that serves as a velocity sensor.

(3) The helical swept airfoils 11 are comprised of four (4) to six (6) asymmetrical airfoils with a circumferential sweep of a dimension (such as 113.6 inches) to provide from a full width airfoil overlap enabling the capture of wind throughout the circumference from both the windward and leeward sides of the airfoils. As a result, the torque input spreads evenly, thereby mitigating damaging harmonic pulsations that would otherwise arise without the even torque input spread.

Figure 6:
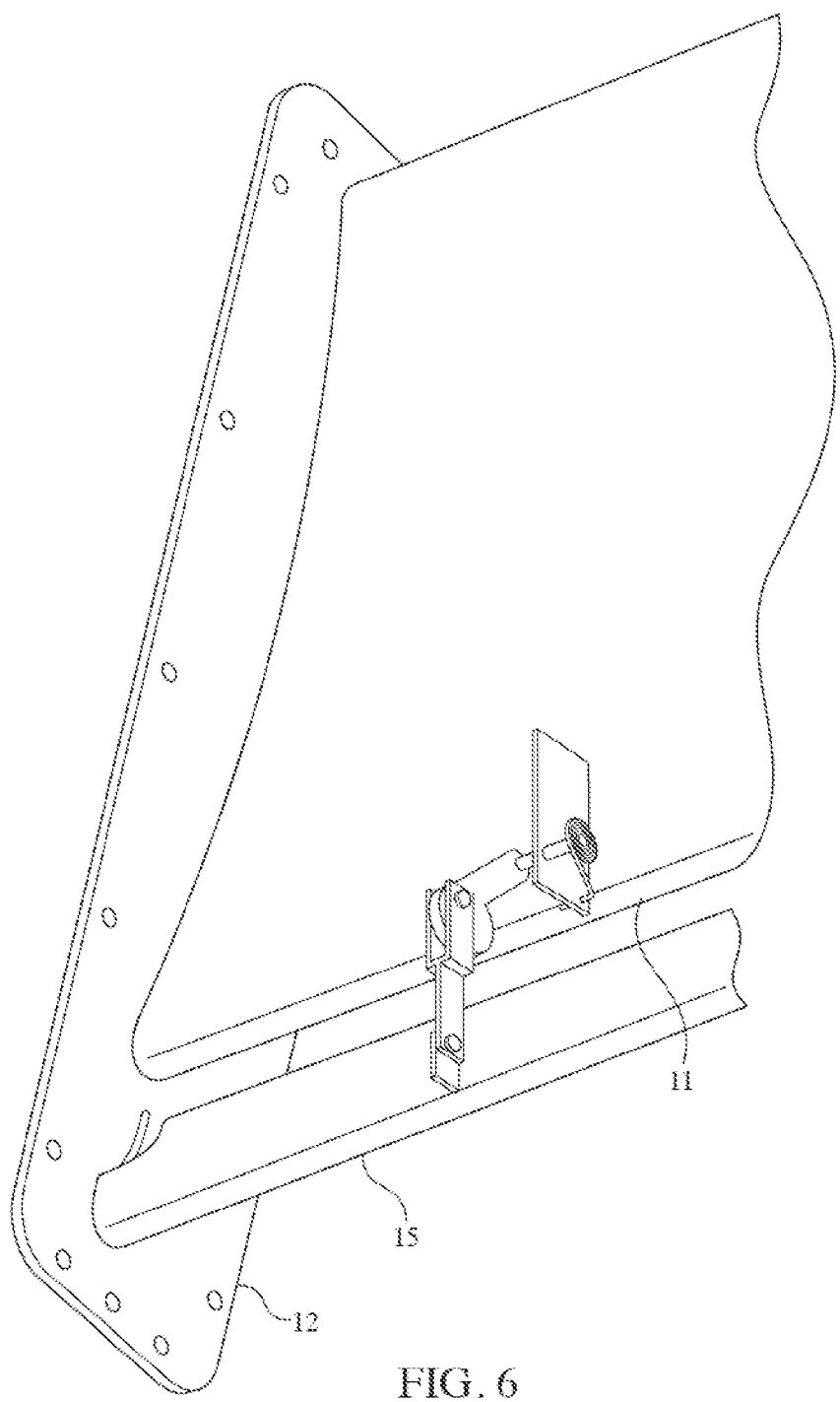
FIG. 6 is an isometric view of a free end of one of the helix swept airfoils of the vertical axis wind turbine of FIG. 1.

(4) A centrifugal force deployed leading edge slat 15 (self-starting), is shown in FIG. 6 and is utilized by the rotary asymmetrical helical swept airfoils 11. The slat 15 is moved into a deployed position from a retracted position to increase the helical swept airfoil's camber and angle of attack beyond that for the leading edge slat in the retraced position. The leading edge slat deploys via a spring loaded extendable hinge mechanism while at rest and retracts at a pre-set rate as rotation induced centrifugal force is imparted on the rotating eccentric cams.

Figure 7A:
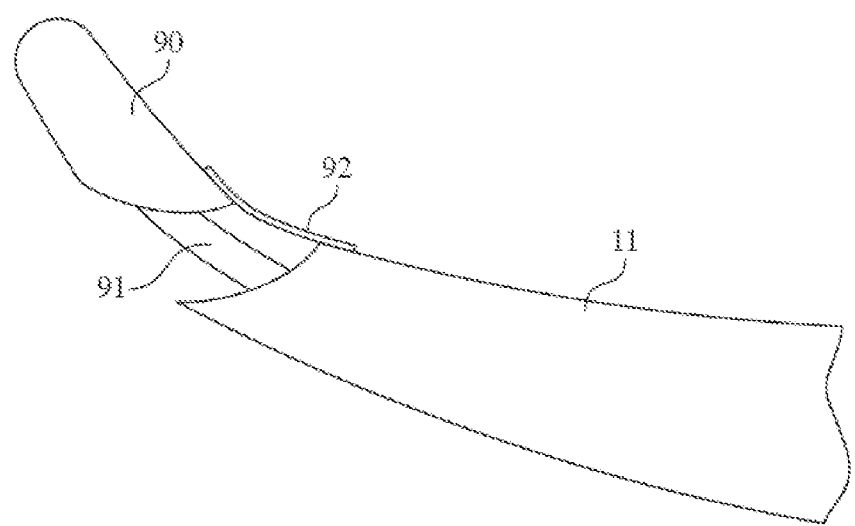
FIGS. 7A and 7B are isometric views of a free end of one of the helical swept airfoils of FIG. 4 and the leading edge slat in respective retracted and deployed positions and a spoiler in respective deployed and retracted positions.
Figure 7B:
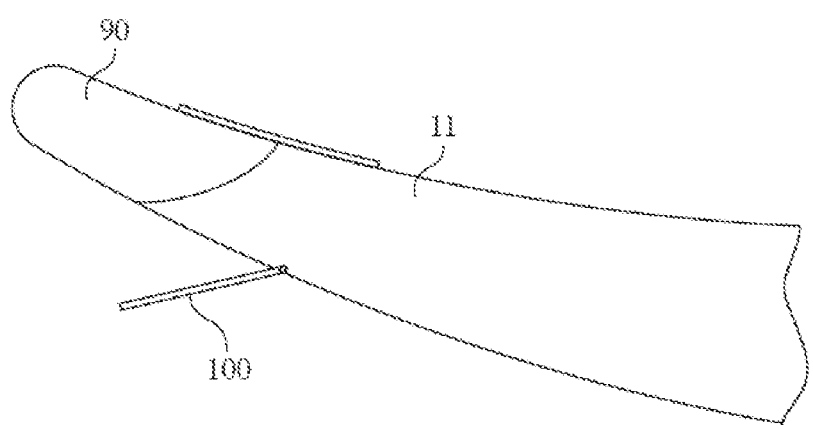

(5) A centrifugal force deployed trailing edge flap 90 (self-starting) of FIGS. 7A and 7B is utilized by the rotary asymmetrical helical swept airfoils 11. The flap is moved to increase the helical swept airfoil's camber, platform area and angle of attack beyond that for the flap being in the retracted position. The trailing edge flap deploys via a spring loaded extendable hinge mechanism while at rest and retracts at a pre-set rate as rotation induced centrifugal force is imparted on the rotating eccentric cams.

(6) At the top and bottom edge of each airfoil section, the rotary asymmetrical helical swept airfoils utilized a stationary boundary layer fence 12 (self-starting) of FIG. 6. The fence is affixed perpendicular to the rotational axis that act to obstruct span-wise airflow. The fence also reduces the noise arising from rotation of the helical swept airfoils by dispersing the sound waves by changing the direction of the airflow along the helical swept airfoils.

(7) An electric motor with a drive gear that is moved along its axis by a momentarily activated solenoid engages an externally geared flywheel upon sensing rotary airfoil motion. (self starting)

A Spring Loaded Extendable Hinge Mechanism

Figure 5:
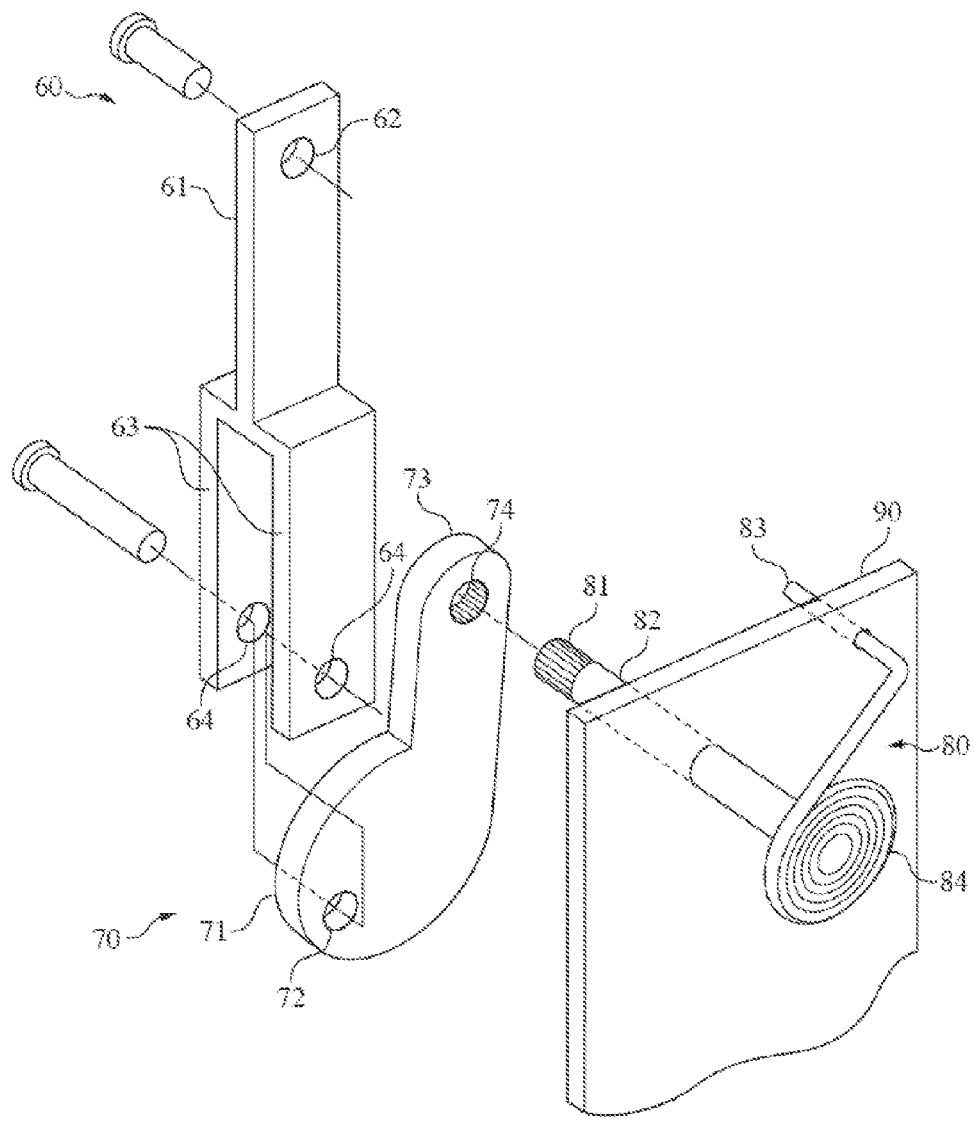
FIG. 5 is an exploded isometric view of spring pivot mechanism that may be used to move a leading edge slat a trailing edge flap and a helical swept wind spoiler between their respective retracted and deployed positions.

FIG. 5 shows the four components of a spring loaded extendable hinge mechanism that urges between deployed and retracted positions. The four components are a pronged fork actuation bracket 60, an eccentric cam 70, a spring loaded tension piece 80 and a support plate 90.

The pronged fork actuation bracket 60 includes a single tine 61 with a hole 62 and two prongs 63 each with a respective one of two aligned holes 64. The single tine 61 and the two prongs extend in opposite directions from a common central region. The two prongs are substantially the same length and are substantially parallel to each other.

The eccentric cam 70 has an oval portion 71 with a hole 72 and a rounded elongated portion 73 with a hole 74.

The spring loaded tension piece 80 includes a multi-parallel grooved end portion 81 at the end of a shaft 82 that in turn extends from a coiled spring 84 at its opposite end.

The outer most coiled strand of the coiled spring 84 extends outward away from the rest of the coiled spring to bend and terminate into a tang 83.

Figure 8A:
FIG. 8A and FIG. 8B are schematic views of the entire one of the helical swept airfoils of FIGS. 7A and 7A including the remaining free end of the one of the helical swept airfoils of FIGS. 7A and 7B and a trailing edge flap in respective retracted and deployed positions.
Figure 8B:
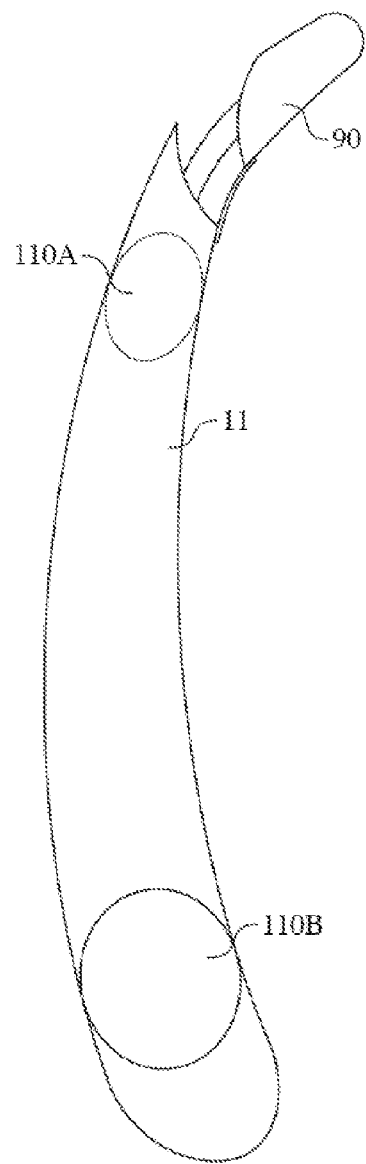

The support plate 90 has two holes spaced apart from each other approximately by the length of the outer most coiled strand of the coiled spring 84 and are dimensioned to accommodate insertion of the shaft 82 and the tang 83 respectively. The support plate 90 is secured to an appropriate one of the helical swept airfoils in the vicinity of the locations 110A, 110B or 110C of FIGS. 8A and 8B to permit deployment and retraction of either the spoiler 100, slat 15 or flap 90. While each helical swept airfoil has its own flap 90 and slat 15, the slat deploys/retracts on the leading edge and the flap deploys/retracts on the trailing edge (FIGS. 7A, 7B). There is a metallic strip 92 that extends across the gap formed when the flap 90 is in its deployed (extended) position) and generally follows the contour curvature of the helical swept airfoil. When the flap 90 is in its retracted position, the metallic strip 92 remains, but will be held in position against the helical swept airfoil by centrifugal forces during rotation of the helical swept airfoils.

A series of spoilers 100 are provided on each helical swept airfoil. Each spoiler 100 deploys outward in the manner of FIG. 7B, but only when the flap 90 is in its retracted position. When the flap 90 enters into its deployed position, the spoiler moves into its retracted position, which can be accommodated by a recess formed in the helical swept airfoil. Both the slat and flap deploy together and retract together, opposite to that of the state of deployment/retraction of the spoiler.

To assemble, the shaft 82 and the tang 83 of the coiled spring 84 is inserted into appropriate ones of the holes in the support plate 90. The multi-parallel grooved end portion 81 is fitted into the hole 74, which is grooved in a complementary manner.

The remaining hole 72 in the oval portion 71 of the eccentric cam 70 is aligned between the two aligned holes 64 of the pronged actuation bracket 60. A pin is inserted through the three holes and riveted at its outer portions to retain the hinge 70 and the actuation bracket 60 in pivot connection with each other.

The remaining hole 62 of the pronged actuation bracket 60 is fitted with a further pin that is secured to the element being deployed (e.g., spoiler, slat or flap).

Deterrents to Over-Speed (a) A centrifugal force deployed boundary layer spoiler 100 (over-speed deterrence) is with the helical swept airfoil 11 to serve as a span wise spoiler. The spoiler 100 extends above the boundary layer 12 along the leeward airfoil surface to provide an aerodynamic deterrent (speed brake) in over-speed situations. Under normal operating speeds the spoiler 100 is fully retracted via spring tension imparted by the spring loaded extendable hinge mechanism of FIG. 5. In over-speed situations the spoiler 100 is extended by centrifugal force deployed eccentric cams.

Figure 9:
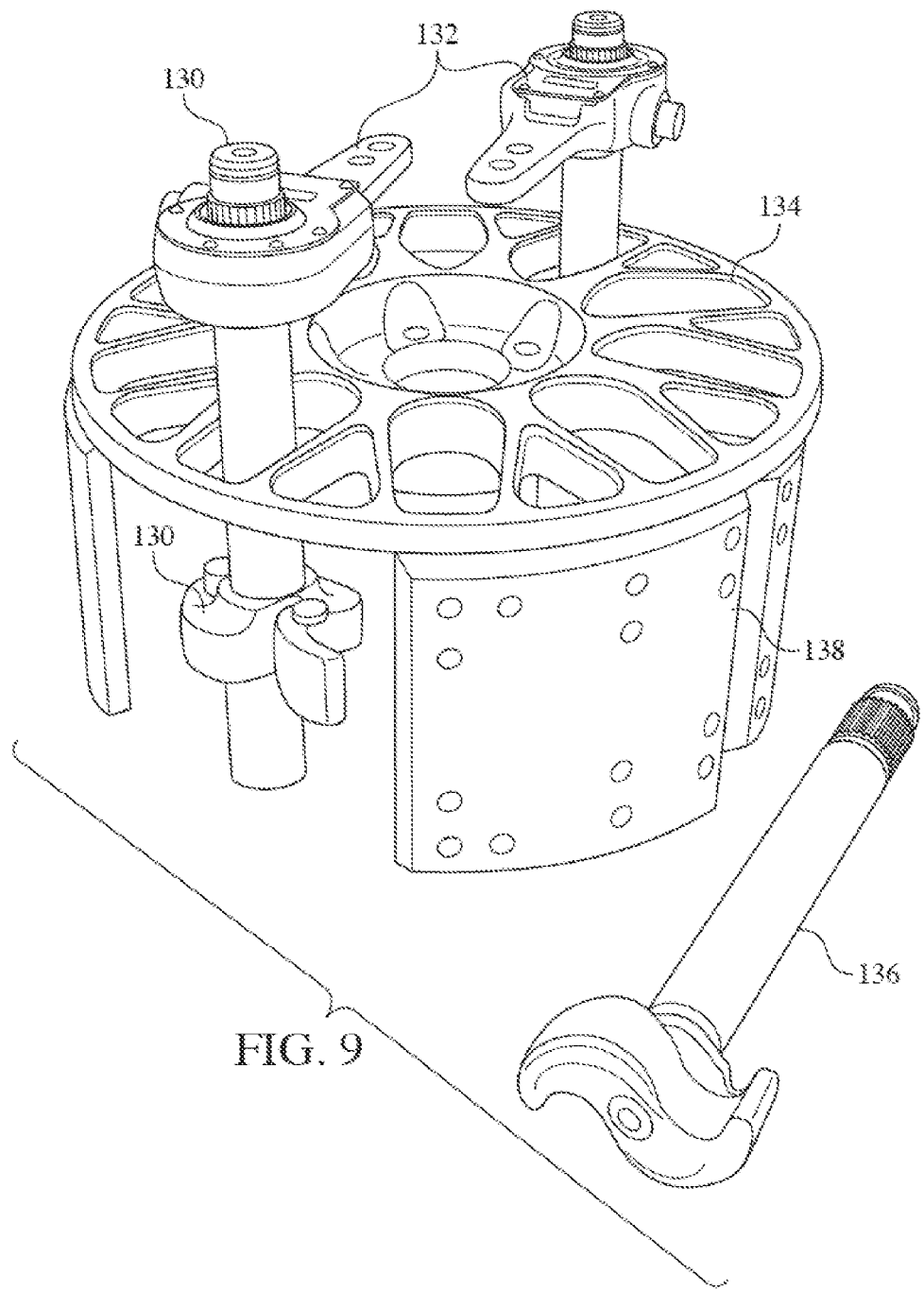
FIG. 9 is an isometric view of a ventilated backing plate complete with actuator S cams and centrifugal bob weights.
Figure 13A:
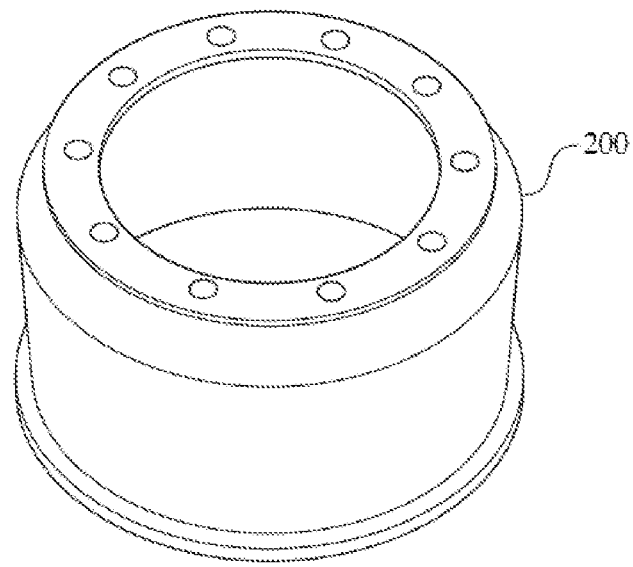
FIG. 13A is an isometric top view of a conventional fixed drum.
Figure 13B:
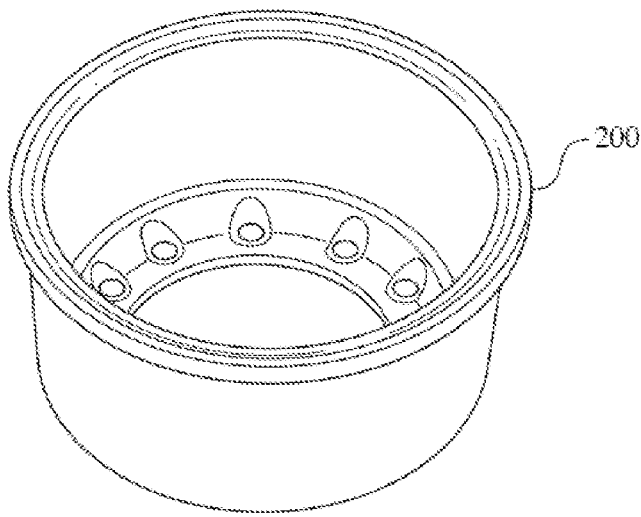
FIG. 13B is an isometric bottom view of a conventional fixed drum.

(b) Turning to FIG. 9, a brake assembly is depicted that includes a pair of centrifugal runaway brakes (over-speed deterrence) that enable rotary airfoil over-speed control by a pair of the centrifugally deployed brake shoes 138 that rotate with the main shaft and are housed within a fixed drum, such as the conventional drum 200 of FIGS. 13A, 13B. The main shaft rotates in response to rotation of the helical swept airfoil 11.

(c) FIGS. 15A and B show a conventional fixed drum that may be used. Each brake shoe 138 has two friction surfaces. The centrifugal actuator mechanism is comprised of two centrifugal force activated bob-weights 132 that rotate twin eccentric cams 136, which increases the coefficient of friction between the rotating brake shoes 138 and the fixed drum as speed increases.

(d) The run-away braking system is activated by the centrifugal force imparted on the rotating brake shoe assembly and its corresponding bob-weight actuators. The brake shoes 138 retract via springs at normal operating speeds and extend at a pre-programmed rate as revolutions per minute (RPM) induced centrifugal force is imparted on the bob-weights 132, in correspondence with the eccentric cams 136 and brake shoes 138.

(e) When the speed of the main shaft increases (for instance, in response to increased wind speed), the bob-weight is progressively forced outwards by centrifugal force. When the main shaft is not rotating (such as due to the absence of wind) forces, the axial springs return the bob-weights to a fully retracted position. As shaft RPM increases the centrifugal force forces the bob-weights out by centrifugal force.

(f) The self-ventilating centrifugal brake shoe backing plate 134 (over-speed deterrence) is provided as a spirally slotted plate. As a result, the centrifugally activated brake shoes are supported on this spirally slotted plate, which draws cold air from underneath, thus creating an accelerated airflow past the friction brake shoes that subsequently expel the heated air through the central orifice of the brake drum. The self-ventilated backing plate 134 is complete with the brake shoes 138, actuator "S" eccentric cams 136 and centrifugal bob-weights 132. For purposes of illustration, there is an uninstalled S cam 136 beside the brake assembly.

(g) The actuator assembly is for the fail safe (backup to ECM controlled electro-mechanical valve) for over speed control. In the event that the wind turbine loses power (lightening strike etc.), the centrifugal force deployed actuator bob-weight would mechanically shut off flow to the high-pressure hydraulic system that is integral to the transmission.

Figure 10:
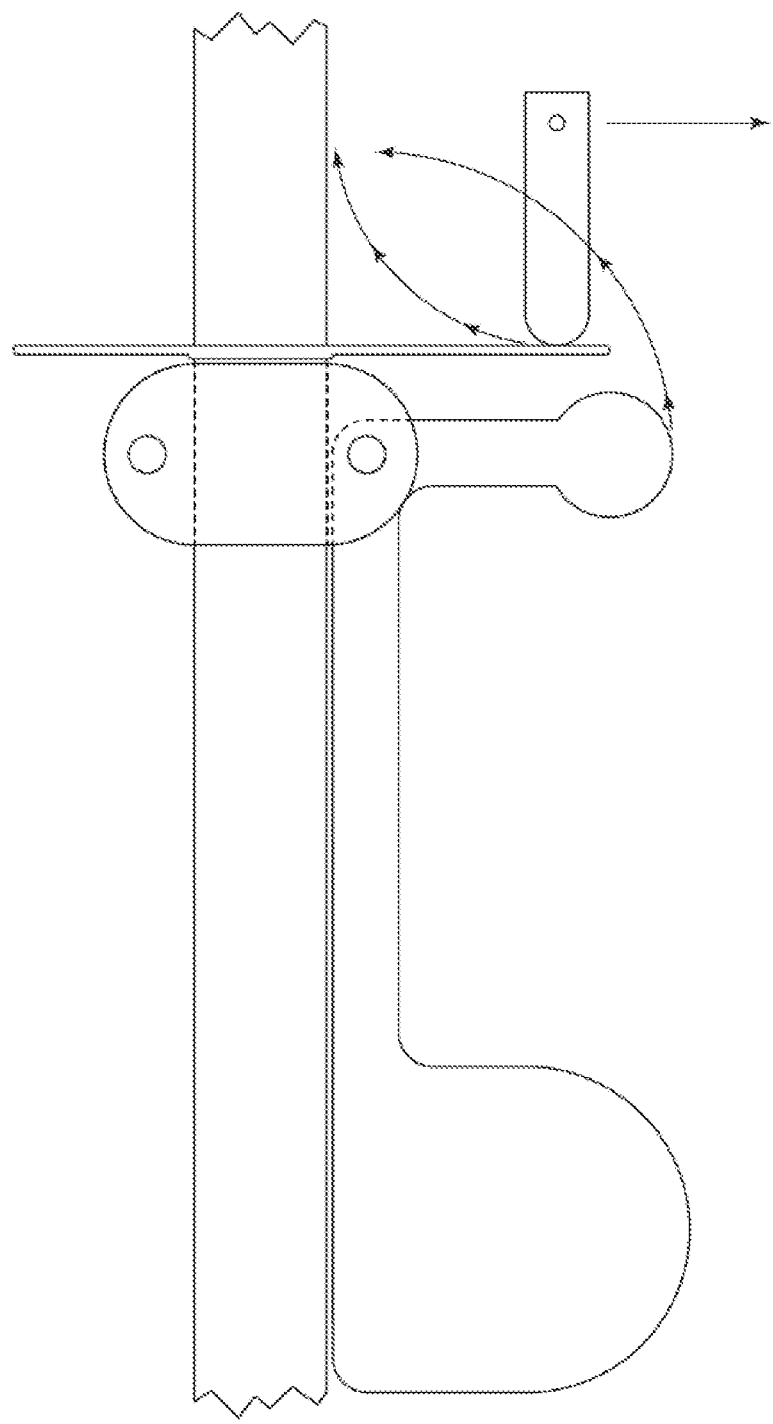
FIG. 10 is a schematic representation of actuator assembly for the fail safe (backup to ECM controlled electromechanical valve) for over speed control. In the event that the wind turbine looses power (lightening strike etc).

Turning to FIG. 10, the horizontal line near the top right is the hydraulic fluid direction of flow. The arc(s) represent the motion of the actuator arm and hydraulic shutoff (ball) valve arm swing. In over speed situations, the system pivots the bob-weight upward which rotates the actuator against a floating disc that rises to contact the hydraulic ball valve lever rotating it 90 degrees to shut off the flow of high pressure hydraulic fluid.

Hydraulic Speed Limiter

An increase in shaft speed and centrifugal force on the bob-weight of the valve actuator causes the actuator to move outward to close the aperture, which acts to restrict the high pressure fluid flow through the valve thus imparting a resistance to the shaft. Variations in shaft velocity are controlled through the combined but opposing forces imparted by return spring pressure and speed-interrelated centrifugal force to control infinitely variable governor valve flow restrictions.

A hydraulic deployment and mechanical drive system is activated to extend and retract locating ground stakes.

Electronic Control Module (ECM) and Related Components (i) The electronic control module (ECM) 60 (FIG. 4B) processes inputs from a series of sensors (See FIG. 20 and discussion later) that measure direction, motion, velocity, acceleration, shaft speed, vibration, temperature, pressure, humidity, wind speed, gusts. The inputs are amalgamated and processed into output commands that control the generating and energy delivery system(s).

(ii) ECM 60 controls the engagement and disengagement of the driveshaft sections in accordance with rotary airfoil torque and monitors electrical production, controls DC current to the AC inverter and processes accelerometer and vibration sensor data into electrical inputs to modulate the magneto-rheological fluid mount system.

(iii) ECM 60 input magnetically engaged conical dog clutch drive shaft along which is moved a narrow spaced tooth male spiraled conical dog clutch via an ECM 60 activated magnet engages a wide spaced tooth female spiraled conical dog clutch. The dog clutch provides for the direct and locked engagement of the drive shaft system. The dog clutch activation command is provided by ECM calculations. There is provided means for powering (via a power supply) a magnetic disc clutch or drum clutch in response to the commands from the ECM 60 to effect engagement of the driveshaft sections. There is means for powering (via a power supply) a magnetic dog clutch responsive to further commands from the ECM 60 to effect a mechanical lock or link between the driveshaft sections and thereafter shutting off power to the magnetic disc clutch or drum clutch to disengage. There is also means for shutting off power to the magnetic dog clutch in response to additional commands from the ECM 60.

(iv) ECM 60 input magnetic clutch generator may be engaged or disengaged via a dedicated magnetic clutch by ECM 60 inputs.

(v) ECM 60 controlled mounts—The torque moment and harmonic input generated through the rotary airfoil assembly and transmission gear shifts are monitored by vibration and velocity sensors placed through the structure that generate electrical inputs to the ECM 60 that processes the data permitting it to continuously modify the flex modulus of the magneto-rheological fluid mounts.

(vi) ECM 60 controlled 6-speed transmission with hydraulic speed control (over-speed deterrence) is clutchless to control the speed of the driveshaft sections. The ECM 60 controlled 6-speed transmission is shifted via an ECM 60 controlled shift servo. The transmission is constructed with an infinitely variable flow aperture restricted internal hydraulic pump to control operational wind gust generated over-speed situations via ECM 60 inputs.

Alternators/Generators

Multiple alternators 50 (FIGS. 4B through 4D) or generators are integrated into the wind turbine, which generates electrical output at extremely low wind speeds, and the multiple alternators have a breakaway torque requirement of 20 inch pounds (in. lb). The alternators are arranged in a linear, vertical stack with a common driveshaft sections that are segregated by magnetic clutches that engage and disengage the alternators in response to electrical load and kinetic energy availability without the utilization of pulleys, idlers, pillow blocks, drive belts (such as those of U.S. Pat. No. 4,585,950) or inertial storage devices (such as US Patent Application Publication No. 2010/0270800), The alternators may be switched on in succession as available energy increases in response to faster helical swept airfoil rotation because of increasing wind speeds. Each alternator is conventional and described under one or more of the following U.S. Pat. Nos. 5,203,179; 5,284,026; 5,397,975; 5,502,368; 6,111,768; 6,703,741, each of whose contents are incorporated herein by reference.

Power Takeoff, Thermal Control and Illuminated Sign (a) Power takeoff—the driveshaft sections are connected to a right angle drive that provides an external mechanical drive link, thus enabling the wind turbine to perform the mechanical functions of a windmill.

(b) Thermal control—heated air is forced to the top of the housing by individual fans that are affixed to the driveshaft sections below each alternator. A large diameter fan is affixed to the driveshaft sections above the transmission to expel the heated air from exhaust vents that populate the upper perimeter of the housing.

Figure 14:
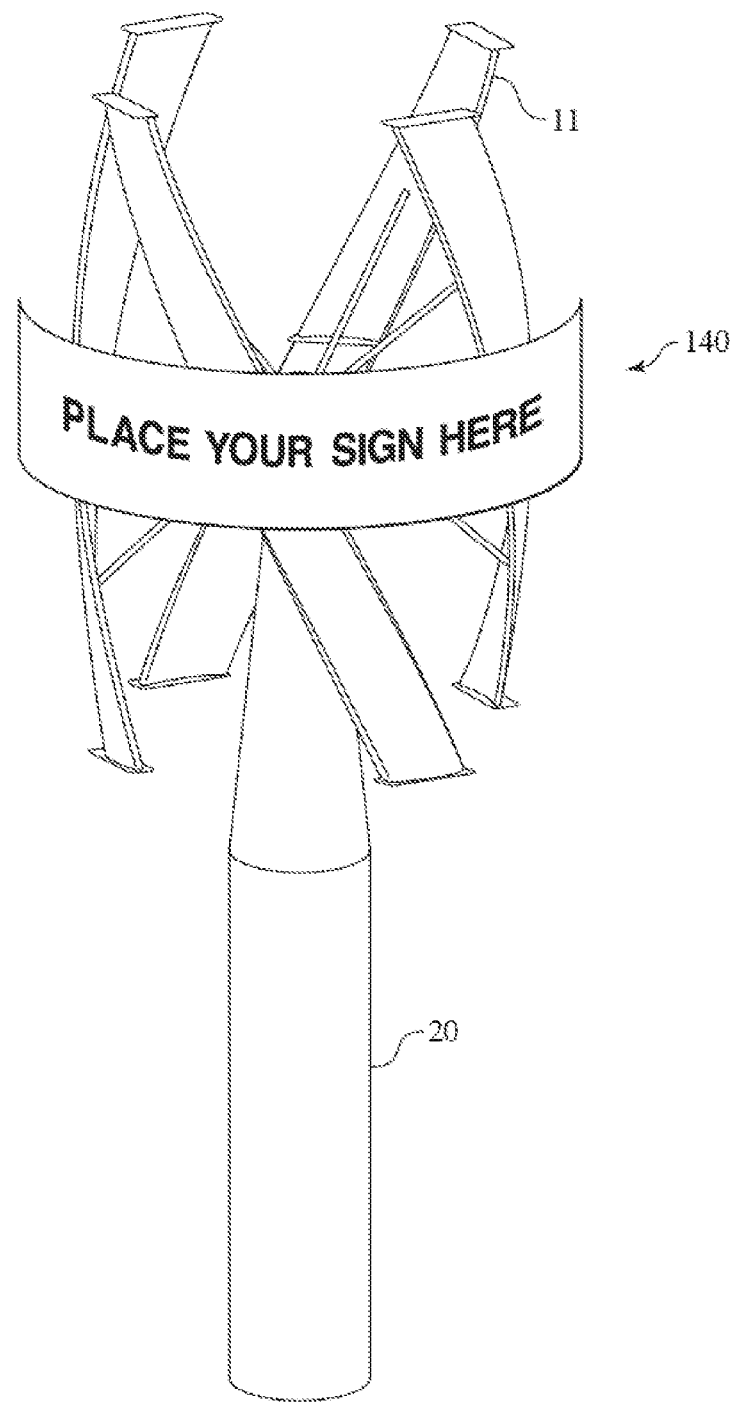
FIG. 14 is an isometric view of the vertical wind turbine of FIGS. 1 and 2 equipped with a programmable, illuminated sign.

(c) FIG. 14 shows a programmable 360 degree illuminated stationary sign 140 on a variable speed rotary device. Such arises as words or graphic logos from airfoils or blades that rotate at variable RPMs, such as are found on wind mills, wind turbines and helicopters. The image is displayed by energizing and de-energizing lights that are laminated into an overlay that covers the visible rotating apparatus on the helical swept airfoils in either a horizontal or vertical plane. The input for the signage is controlled via EC that incorporates a logarithm to compensate for RPM variations based on sensor readings of changes in the velocity of the helical swept airfoils.

The programmable 360-degree illuminated stationary sign module, in response to inputs from sensors that detect changes in velocity of the helical swept airfoils over time, sends signals to direct the timing of illumination of the lights to compensate for fluctuations in the velocity of the helical swept airfoils over time due to variations in wind flow over time so that the desired pattern appears substantially the same over time even though the fluctuations in the velocity of the helical swept airfoils is present during the illumination of the lights.

Horizontal Axis Wind Turbine

Figure 11:
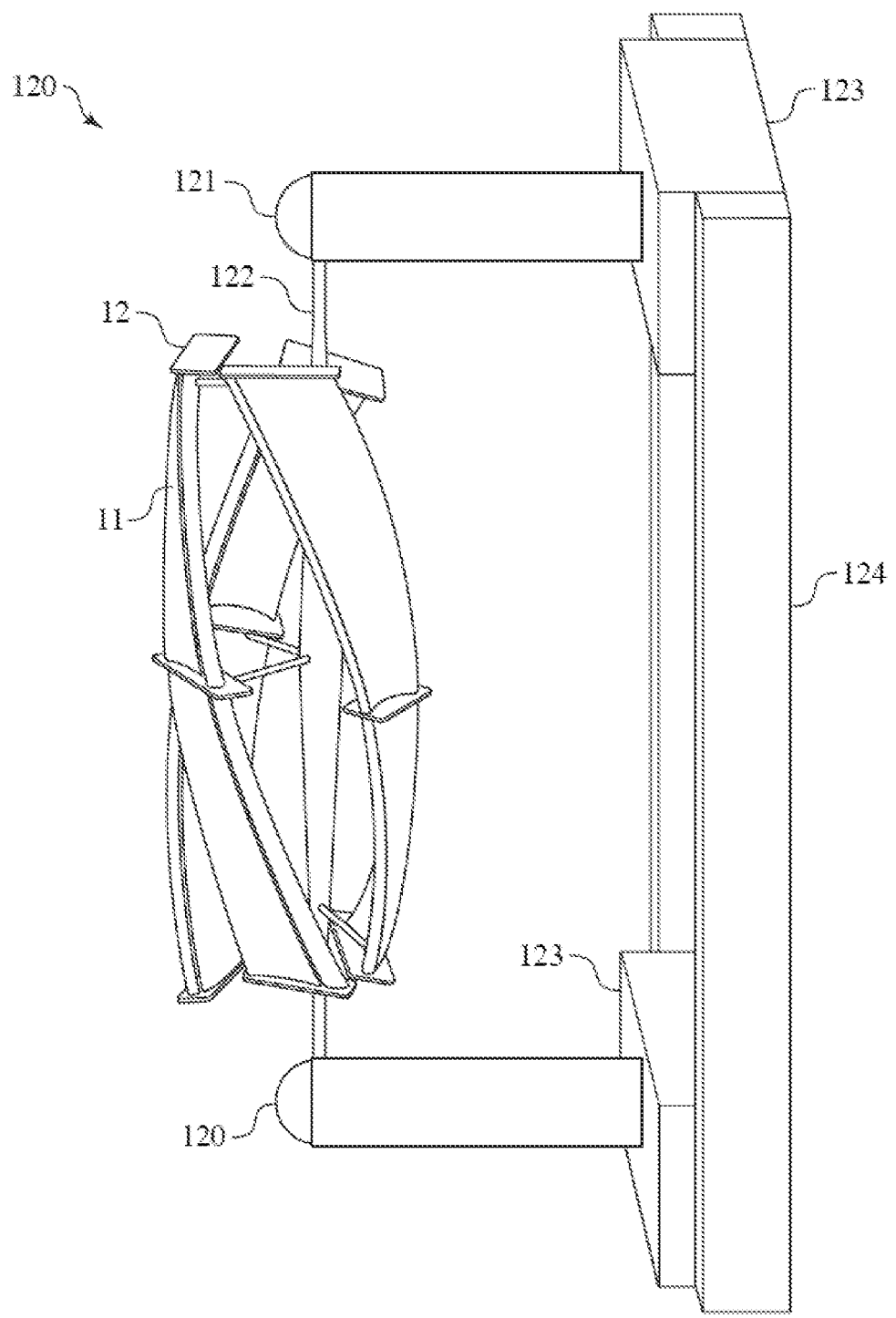
FIG. 11 is an isometric view of a self-contained horizontal axis wind turbine in a deployed position.
Figure 12:
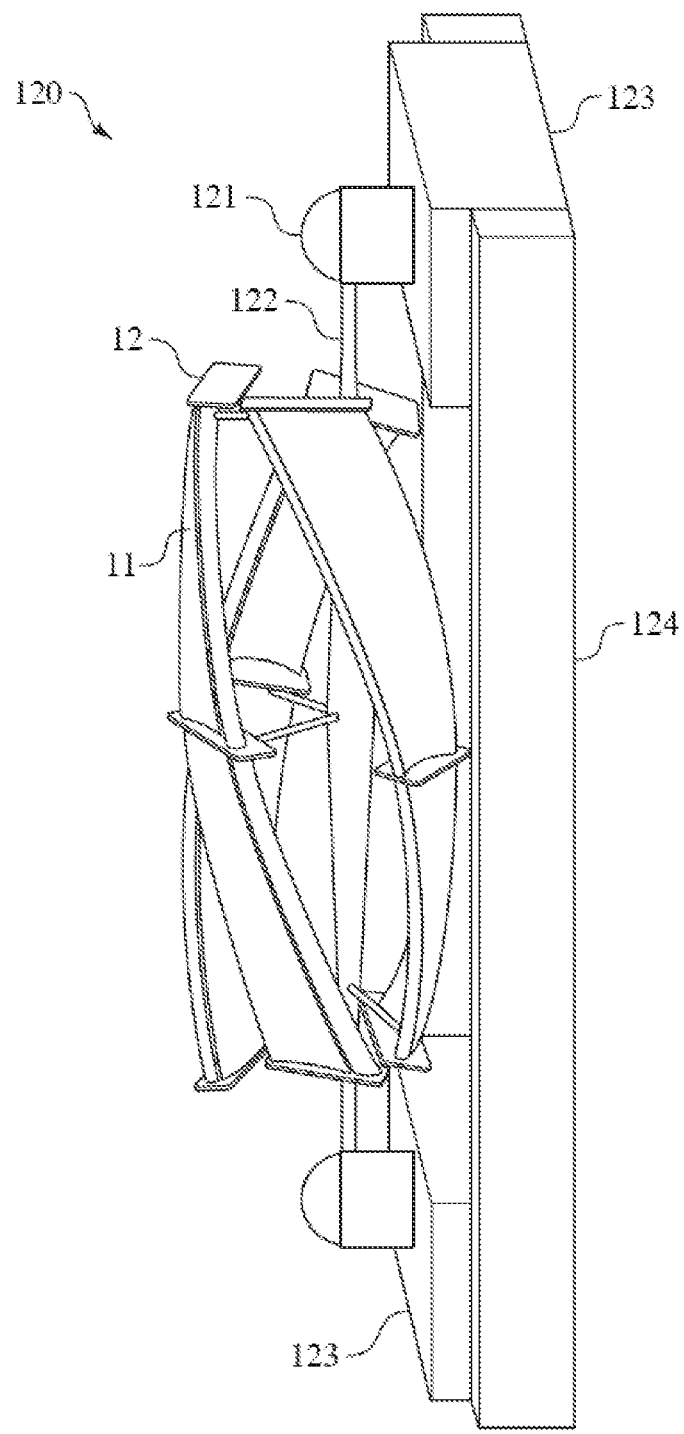
FIG. 12 is an isometric view of the self-contained horizontal axis wind turbine of FIG. 8 but in a stowed position, i.e., a collapsed or retracted condition.

FIGS. 11 and 12 show a collapsible horizontal axis wind turbine suited to supply renewable electricity to a forward operations base and a platform for autonomous robots to automatically recharge via permanently affixed charging pads. The supply of renewable electricity is from a wind turbine equipped with redundant generators, AC & DC distribution and electrical control systems, robot charging pads, hydraulic deployment and mechanical drive systems.

The collapsible horizontal axis wind turbine includes helical swept airfoils 11 that connect via rods at their centers to the central region of a shaft 122 that gradually widens away from its free ends to the center. Each of the helical swept airfoils 11 have boundary layers 12 at their opposite ends. The shaft 122 is supported on spaced apart collapsible cylindrical towers 20, 21, which in turn are supported by separate bases 123. The separate bases 123 are kept spaced apart by two parallel beams 124.

In operation, the helical swept airfoils 11 rotate in response to wind forces.

The collapsible horizontal axis wind turbine can be positioned, as best seen in FIG. 11 by comparing to that of FIG. 12, to operate at any one of a plurality of different heights by adjusting telescoping cylindrical towers 120, 121 according so that their overall height matches a desired variable height. The variable heights attainable are from 5.5 m to a fully extended maximum operating height of 10 m. The adjustable height is achieved via the telescoping cylindrical towers 120 that extend for operation via a redundant manual and or automatically activated hydraulic system.

For shipping transport purposes as best seen in FIG. 12, the wind turbine towers are retracted to a height of 2.3 m via the redundant manual and or automatically activated hydraulic system thus permitting its insertion into a standard 20' shipping container. The adjustable height telescoping cylindrical towers house 90° helical tooth spiral bevel gear speed multipliers that drive the automatically adjustable drive shafts and redundant generators. The standard 20' shipping container may be referred to as a sea-land container, which is of standard dimensions to both accommodate cargo and ease loading and unloading of transport into and out of vehicles/vessels/aircraft.

The wind turbine features two (2) autonomous/redundant generators that are mounted in at opposite ends of the chassis in weatherproof machinery enclosures. Rotational input for the independent generators is accomplished via variable length drive shafts that are housed in the variable height towers. Power conditioning and distribution hardware is housed in the weatherproof machinery enclosures. The wind turbine utilizes the same redundant manual and or automatically activated hydraulic system to extend and retract the locating ground stakes.

The leading edge slat helical swept airfoil horizontal axis wind turbine is supported on variable height cylindrical towers that extend for operation and retract for transport via a redundant manual and or automatically activated hydraulic system.

The wind turbine and underlying pneumatic tire suspension retracts enabling the entire apparatus to package into a standard 20' shipping container. For the standard 20' shipping container, ingress and egress is facilitated by extending suspension via a redundant hydraulic jack system to lift the chassis from the container floor. The insertion and removal of the wind turbine from the standard shipping container is facilitated via a manually operated reversible winch. The wind turbine is housed within a fully mobile chassis that is equipped a redundant hydraulic system that fully extends the pneumatic tire suspension with brakes on each axle to provide off-road capable chassis ground clearance. The same hydraulic system retracts the suspension at the operating site and extends the ground stakes. The wind turbine is transported to and from the theater of operation via a standard Hunvee pintle hook connection. The wind turbine is suitable for helicopter transport due to its light weight.

Solar

Figure 16:
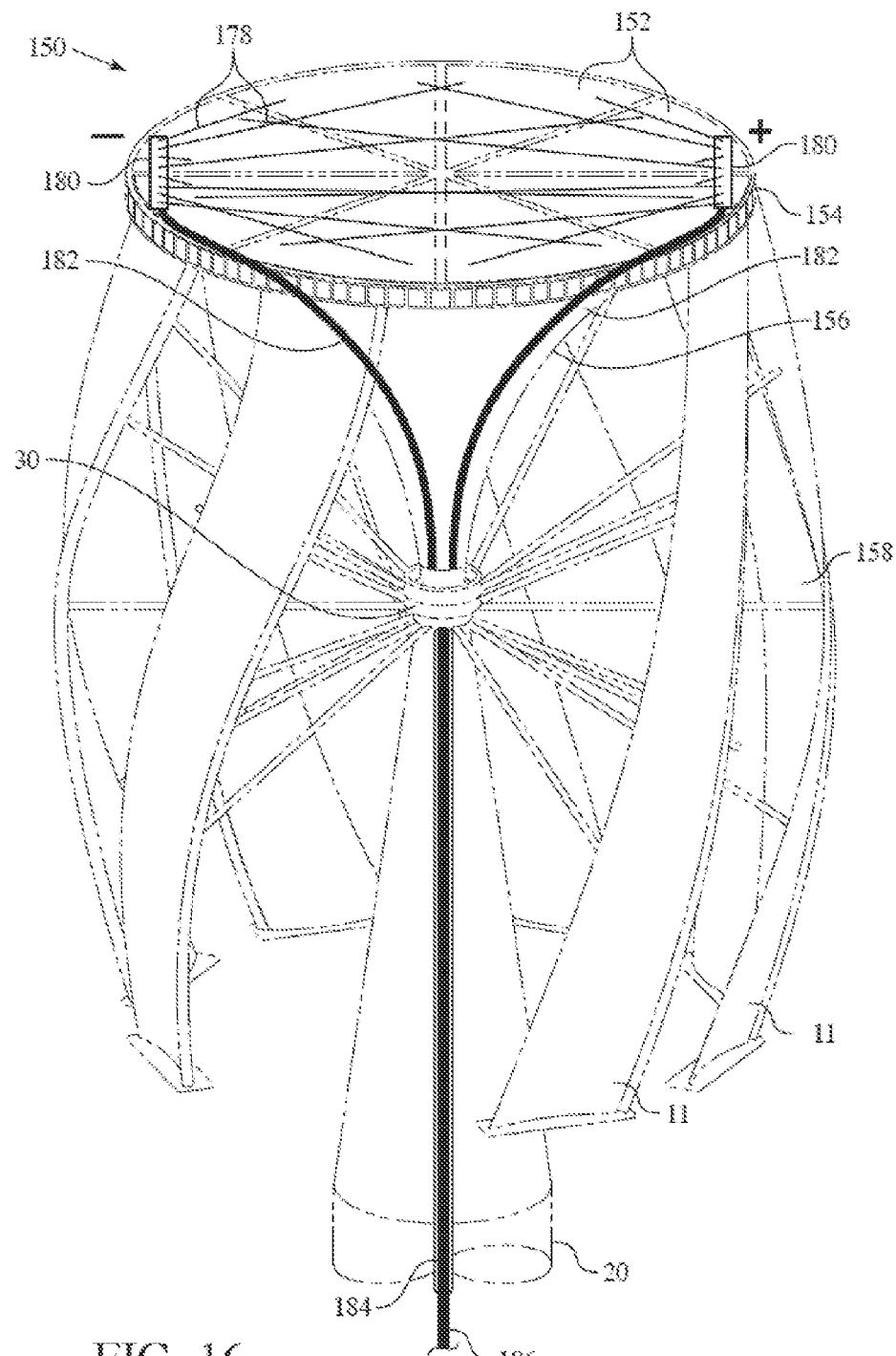
FIG. 16 is a schematic view of the placement of wires upon a support cone for the solar collector of FIG. 15.

Turning to FIG. 16, the VAWT of FIGS. 1-10 is modified so that a self-cleaning solar photovoltaic panel arrangement 150 is provided whose underside periphery supports ends of each of the helical swept airfoils 11 to provide stability. Solar photovoltaic panels 152 may be arranged on the top surface of an axial member in the form of an inverted support cone 156 that converges from a circular frame 154 to the hub 30. Two wires may extend diametrically opposite each other from the solar photovoltaic panels 152 down the slope of the inverted support cone 156 to the hub 30. The inverted support cone 156 may rotate in unison with rotation of the helical swept airfoils 11 and with the circular frame 154 that supports the solar photovoltaic panels 152.

Figure 15:
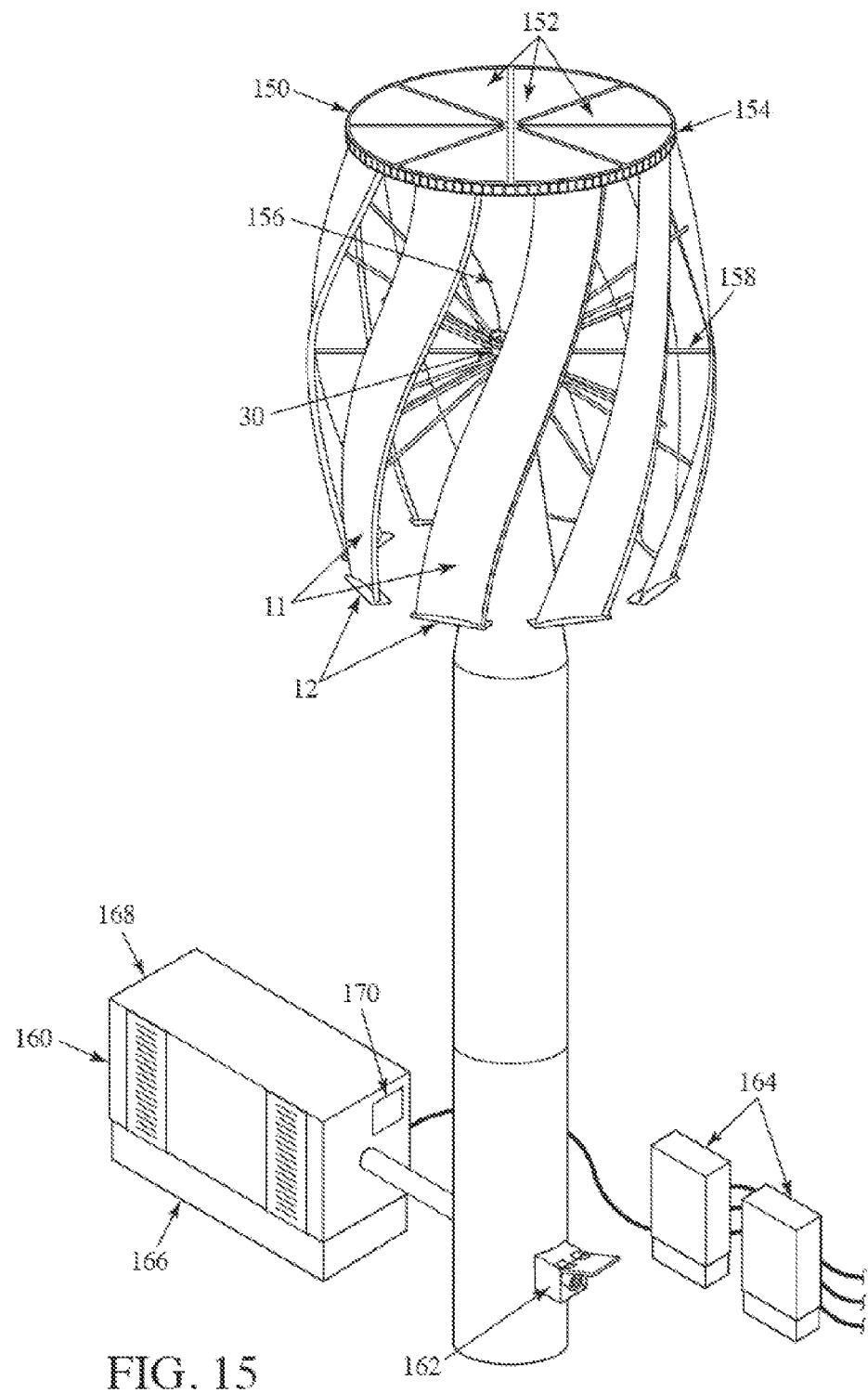
FIG. 15 is an isometric view of a vertical axis wind turbine of FIGS. 1-10 equipped with a solar collector, a generator with battery backup and an inverter, and dwelling supply meters.

There is a plurality of elongated rods 158 in connection with the hollow tube 15 and/or magnetic repulsion levitated rotary airfoil hub 30 of FIG. 2 that rotate in unison therewith. Each of the helical swept airfoils 11 of FIG. 15 is connected to an associated one of the plurality of elongated rods 158.

A generator 160 turns via a PT 90 lb-ft torque rod 162 to translate via a gear transmission the rotary motion from the hollow tube 156 to the torque rod 162c to turn the generator 160 to generate electricity. Wires in the hollow tube from the solar photovoltaic panel arrangement 150 may be run together with the wires from the generator 160 to provide electricity that passes through the dwelling supply meters 164.

The generator 160 is mounted above a flood plain by machinery housing 166 and there is a conventional battery backup 168, such as having the capability of providing 80 kwh of power backup. A conventional power inverter 170 is provided that is an electronic device or circuitry that changes direct current (DC) to alternating current (AC). Such a conventional power inverter is exemplified by a 5 kw, 240 VAC, 50 or 60 Hz inverter.

Solar Collector Wiring

Turning to FIG. 16, a circuit for the solar photovoltaic panels 152 is shown that includes two contact strips 180, one being positive and the other being negative. Each of the solar photovoltaic panels 152 have wires 178 that extend to appropriate ones of the two contact strips 180 to convey a positive or negative charge as the case may be. There are two wires 182 that extend from opposite diametric sides of the inverted conical member 156 and both feed into confines of the rotary airfoil hub 30 where they are connected to each other to form a single wire 186 that extends through a protective sleeve 184.

Figure 17:
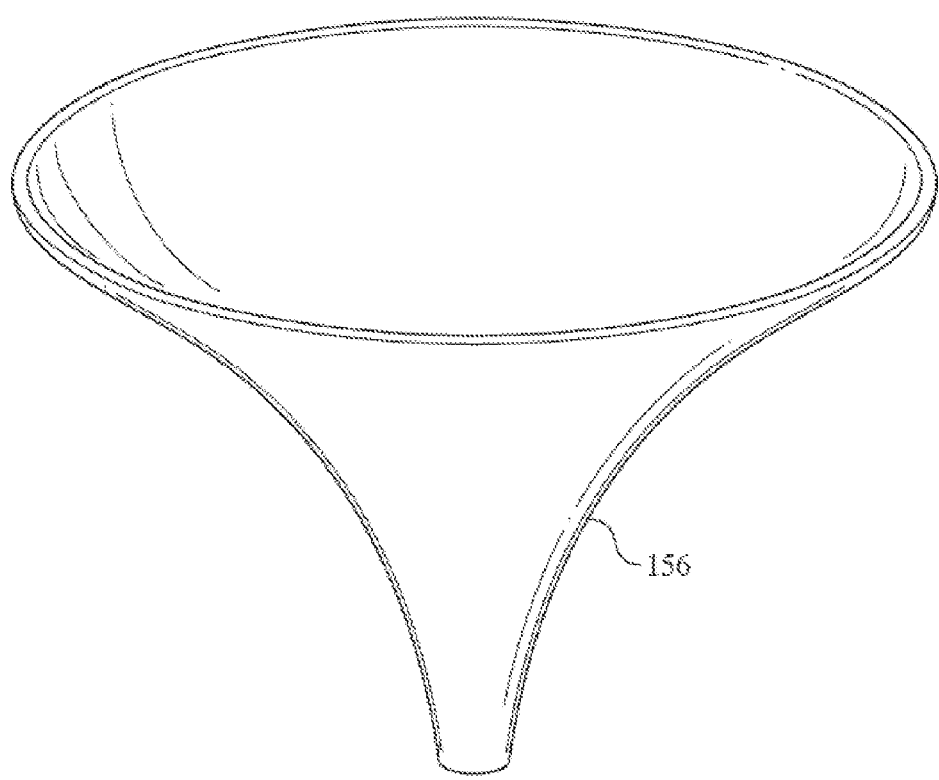
FIG. 17 is an isometric view of the support cone of FIG. 16.

Turning to FIG. 17, an enlargement of the support cone 156 shown.

Transmission Dry Sump Lubricating System & High Pressure System

As is known from US patent application publication no. US 20110168495 A1, whose contents are incorporated by reference:

> In general, a wind turbine gearbox is supplied with oil for lubricating the bearings and meshing gears of the gearbox by a conventionally operated electrical pump. Such pumps may be efficiently operated for lubrication during on grid conditions, thereby, making use of the electric power generated from the turbine. But, during the time of no electric grid or idling, the conventional electrically operated pump cannot be used to supply the oil to the various components of the gearbox including the bearings and meshing gears unless a backup power source is available. The use of an auxiliary power source leads to additional costs and is not generally preferable in view of high cost of operation of the lubrication system. Some other typical wind turbine gearbox lubrication systems include a mechanically coupled geared pump for providing lubricating oil to the gearbox. Such pumps are attached to a gearbox shaft on the blade side of the wind turbine or generator side of the wind turbine.

In accordance with the invention, auxiliary power can be provided from energy produced from the solar photovoltaic panel arrangement 150 mounted atop the wind turbine.

Figure 18:
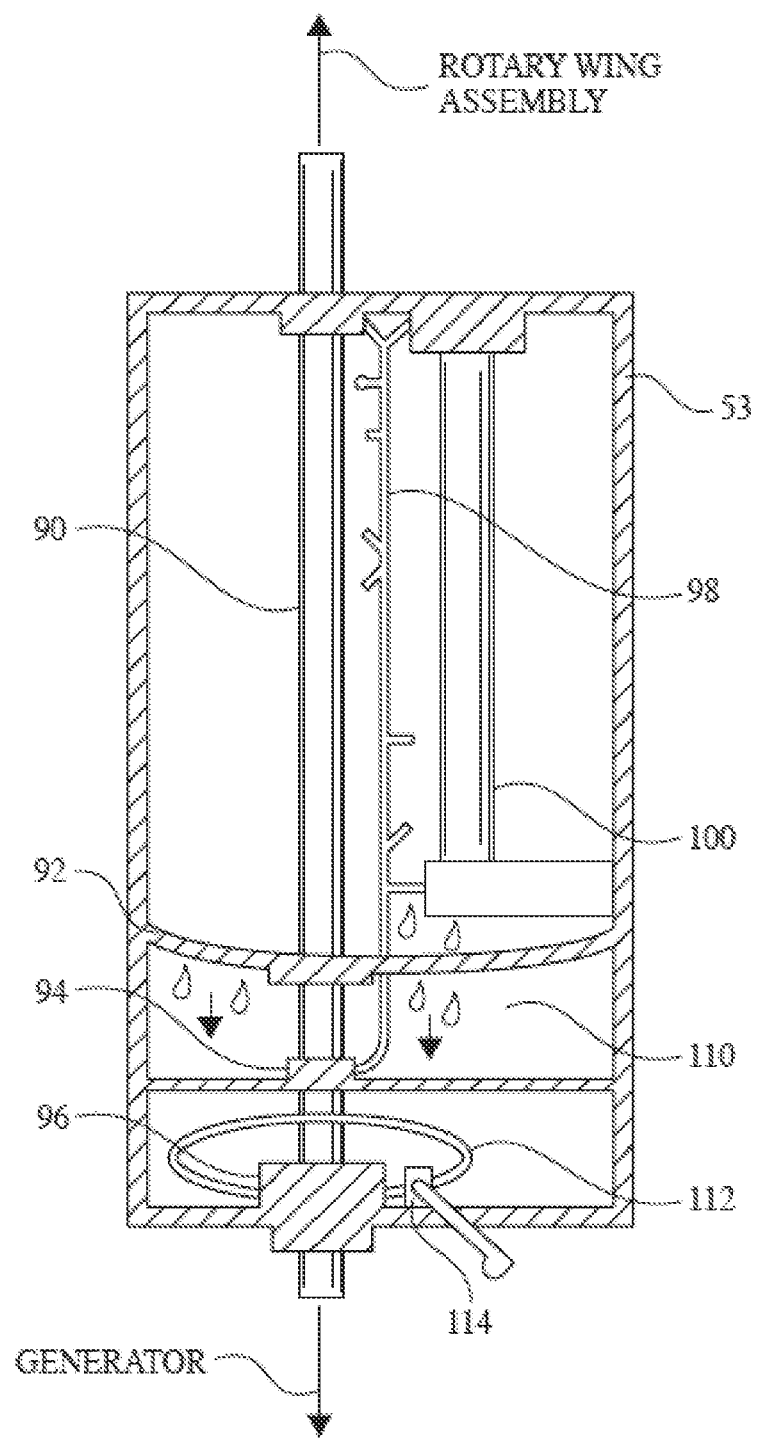
FIG. 18 is a cross-sectional view of a transmission dry sump lubricating system and high pressure system.

Turning to FIG. 18, a transmission 53 of the present invention is shown of the dry sump lubricating system and high pressure system. A main shaft 90 from the rotary wing assembly passes centrally through the transmission 53. The main shaft 90 provides a common link between the rotary wing and all of the rotating devices within the wind turbine and is responsible for turning the generator.

A honeycomb separator 92 is provided that acts as a consolidation surface for lubricant droplets that drip from the "sprayed" gear contact surfaces and serves as a gateway for the targeted "point of contact/friction" oil spray to gather & de-foam before entering the reservoir. The objective of a dedicated low pressure dry sump spray that causes the gear contact surface to be "sprayed" versus a "splash" system is to reduce the requisite system pressure and the pump "resistance coefficient".

An idler shaft 100 is provided that is populated by gears of various different dimensions that are shifted into position with gears of the main shaft 90. Selection of the main shaft gear ratio is dictated by the ECM to maximize generator torque.

The transmission 53 relies on both a low pressure dry sump system and a high pressure closed loop system. The low pressure dry sump system eliminates the parasitic friction associated with gears rotating in a pool of lubricant such is the case in a wet sump configuration. It allows the wind turbine to convert a higher percentage of its inertia/torque into usable electricity generating force. The high pressure closed loop system enables the wind turbine to control minor over speed situations without creating wear on a friction material based braking system. The braking or speed modulation benefit is provided by the closed loop with very little parasitic effect on the drive train until the centrifugal valve restricts flow. However this system only provides a midrange solution. High wind speeds will depend on centrifugal brake deployment.

The concept behind the application involving the low pressure dry sump pump 94 is to minimize the torque required to drive the lubricating pump while solely providing adequate lubrication to the transmission contact/load surfaces.

This low pressure dry sump system aspect of the "transmission system" permits the transmission gears to rotate "in midair", thus eliminating the "surface friction"/parasitic drag imparted that would result from immersion in a lubricant pool. Also present is a dry sump drip rail 98, which is a lubricant distribution tube that provides a pathway for the lubricant to reach the gear contact and bearing surfaces. Underneath the dry sump drip rail 98 is a dry sump tank 10.

The concept behind the application involving the high pressure closed hydraulic loop pump 96 is to impart a counteracting torque load onto the main shaft 90 that is to control midrange overspeed situations.

The invention in effect incorporates both of these dissimilar functions and lubricant pools into a single integrated transmission case. The lubricants used in each of those applications are radically different in both composition and viscosity.

The speed modulator valve 114 is activated by centrifugal force at a preset RPM to perform its function of speed modulation.

Solar Photovoltaic Panels and the Wind Turbine

Figure 19:
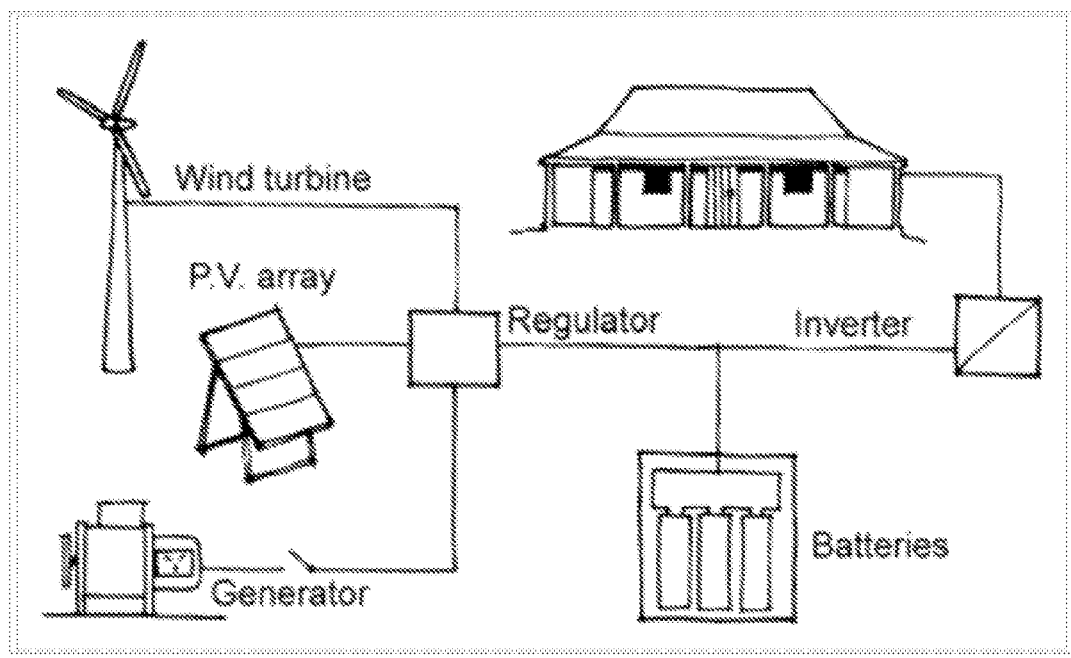
FIG. 19 is a schematic representation of a conventional wind/solar system with battery storage.

The concept of using solar photovoltaic panels and wind turbines in a common application to provide electricity is known conventionally and depicted in FIG. 19.

An article entitled ASK THE EXPERTS: Capturing Varying Wind Energy by Dan Fink, published in Issue #161 in June/July 2014, the article reads:

> A wind turbine generates a different voltage/amperage at different wind speeds, so how does it produce usable power over these varying speeds? Do the power inverters or converters regulate a variable input voltage to a constant output voltage for usage, such as to charge a bank of batteries or feed the grid?
> 
> There are actually a few different ways to convert the variable-frequency, variable-voltage three-phase "wild AC" from a typical wind turbine into a usable form, and the best depends upon your application.
> 
> In most off-grid and grid-tied with battery backup systems, the turbine's wild AC output is rectified to DC, which directly charges the battery bank. The only components between the wind turbine and battery bank are the turbine brake switch, rectifier assembly, and a DC circuit breaker. The batteries provide "control" by regulating turbine voltage down to their own level. This simple strategy works well until the battery bank reaches a full state of charge and can't store any more energy. Unlike a PV array, a wind turbine can't be disconnected from the battery bank—doing so could cause the turbine to overspeed and possibly be damaged. Most wind turbines must have an electrical load on them at all times.

The most common solution is to install a diversion-load controller (also known as a "dump-load" controller) connected directly to the battery bank to send any surplus energy into air- or water-heating elements. This keeps a load on the turbine while preventing overcharging and still provides a good three-stage battery-charging regime. A typical PV controller would shut down the flow into the battery bank to prevent overcharging, while a diversion-load controller simply dumps it directly from the battery bank.

For grid-tied wind systems with no battery bank, new wind turbine control technologies were developed using grid-tied inverters and maximum power point tracking (MPPT) electronics that send energy directly to your loads and sell excess generation to the utility. These inverters are more complicated than MPPT inverters for PV since the turbine still must always have a load on it. With grid-tied wind inverters, you must program the power curve of the wind turbine into the inverter so it can adjust how hard it loads the turbine in rapidly changing wind conditions. A dump load is still required in case the grid goes down.

MPPT control can also give substantial power boosts, and allows you to "tweak" power curve settings for maximum performance—gaining 15% to 20% is common. One controller manufacturer, MidNite Solar, has developed an MPPT wind controller for battery-based systems so you can dial in that same extra performance.

Sensors

Figure 20:
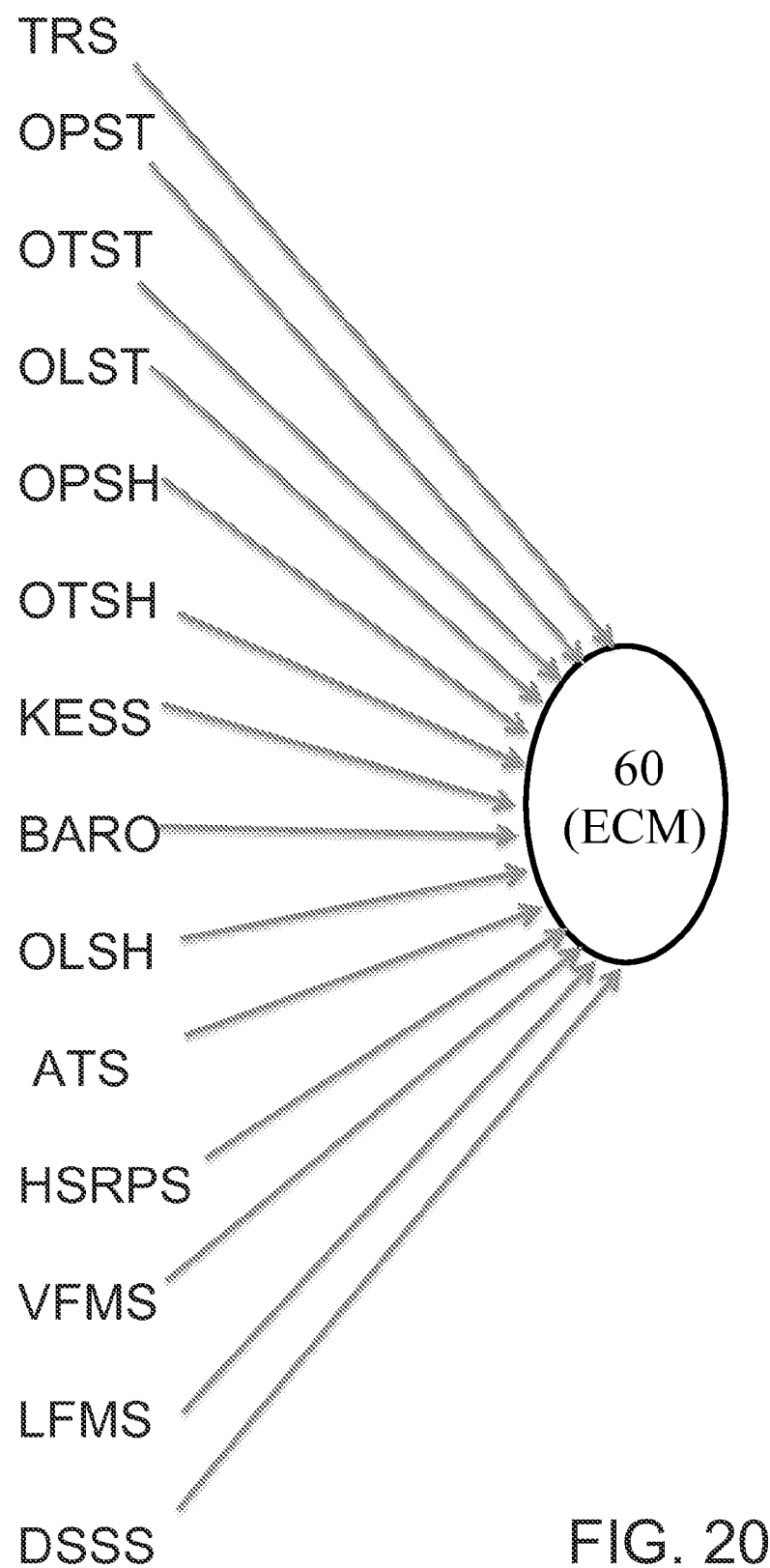
FIG. 20 is a schematic diagram of sensors providing inputs to the ECM.

Turning to the schematic diagram of FIG. 20, the following sensors provide sensor readings as input to the ECM 60. The structure and operation of each sensor is conventional.

TRS (torque reference sensor): monitors rotary wing hub rotational direction, speed, rate of acceleration and deceleration. It provides a series of input signals to the ECM that are processed through an algorithm into drive system and generating outputs that maximize generator management and electrical production.

OPST (oil pressure sensor): advises the ECM of the transmission main oil gallery pressure. A Transmission protective feature programmed into the ECM is calibrated to trigger a primary drive system shut down if the oil pressure drops to a preprogrammed lower limit.

OTT (oil temperature sensor): indicates the transmission oil temperature at all times to the ECM.

OLST (oil level sensor): utilizes optical technology to "sense" oil level for safe monitoring of the oil level.

OPSH (oil pressure sensor): advises the ECM of the rotary wing hub main oil gallery pressure. A hub protective feature programmed into the ECM is calibrated to trigger a drive system shut down if the oil pressure drops to a preprogrammed lower limit.

OTSH (oil temperature sensor): indicates the rotary wing hub transmission oil temperature at all times to the ECM.

OLSH (oil level sensor): utilizes optical technology to "sense" oil level for safe monitoring of the oil level.

KESS (kinetic energy starter sensor): indicates the disengagement of the kinetic energy starter.

BARO (barometric pressure sensor): is sometimes called an atmospheric ambient air pressure sensor, provides the ECM with input to adjust the internal acceleration/deceleration rate algorithm.

ATS (air-temperature sensor): indicates ambient temperature to allow the ECM to alter algorithm output parameters.

HSRPS (high speed reservoir pressure sensor): This sensor provides an input to the ECM on the high pressure speed modulator. The ECM can generate an output that by-passes the flow restriction function at extremely high shaft speeds.

VFMS (vertical frame motion sensor): These sensors provide continuous data on temperature related expansion and contraction rates as well as vertical motion from the foundations and in the individual frame sections.

LFMS (lateral frame motion sensor): These sensors provide continuous data on temperature related expansion and contraction rates as well as vertical motion in the individual frame sections.

DSSS (drive shaft(s) speed sensor): These sensors continuously provide input to the ECM on drive shaft section velocity. When combined with TRS sensor inputs the ECM output commands the individual or synchronous engage the Magnetic Clutch(s) and the subsequent Dog Clutch(s) engagement.

While the foregoing description and drawings represent the preferred embodiments of the present invention, it will be understood that various changes and modifications may be made without departing from the scope of the present invention.

What is claimed is:

1. A wind turbine, comprising:
   a frame structure;
   a rotary airfoil assembly supported by said frame structure, said rotary airfoil assembly including helical swept airfoils and that rotate to capture wind throughout a circumference of the rotary airfoil assembly from both windward and leeward sides;
   permanent magnet disc means for levitating static weight of an entirety of the rotary airfoil assembly via magnetic repulsion, said permanent magnet disc means including double opposing conical needle bearings separated from each other by a toothed ring that all together provide a hall effect and including a velocity sensor that senses a magnetic field from the permanent magnet disc means for electronic inductive pickup and to measure current from which the velocity of the rotation of the helical swept airfoils can be determined;
   hub means for affixing said permanent magnet disc means within said frame structure in a manner that counteracts both a coefficient of friction ("COF") associated with rotation of the rotary airfoil assembly and ensuing bearing wear imparted from the rotary airfoil assembly, and
   electricity generating means for generating electricity in response to rotation of the helical swept airfoils.

2. The wind turbine of claim 1, further comprising:
   runaway brakes having brake shoes that rotate with a main shaft of the helical swept airfoils;
   means for deploying the brake shoes to engage the main shaft under friction by moving the brake shoes from a non-engaging position clear of the main shaft to an engaging position that engages the main shaft to impart the friction; and
   a self ventilating centrifugal brake shoe backing plate that supports said brake shoes and draws air through to create airflow that passes the brake shoes to expel heated air through an orifice of a brake drum of the runaway brakes.

3. The wind turbine of claim 1, further comprising:
   lights on the helical swept airfoils; and
   a programmable 360-degree illuminated stationary sign module that has a variable speed rotary device configured to direct illumination of the lights to form a desired pattern, said programmable 360-degree illuminated stationary sign module, in response to inputs from sensors that detect changes in velocity of the helical swept airfoils over time, sending signals to direct the timing of illumination of the lights to compensate for fluctuations in the velocity of the helical swept airfoils over time due to variations in wind flow over time so that the desired pattern appears substantially the same over time even though the fluctuations in the velocity of the helical swept airfoils is present during the illumination of the lights.

4. The wind turbine of claim 1, further comprising:
fan means for forcing heated air to a top of the housing by individual fans that are affixed to the driveshaft sections below each alternator; and a further fan affixed to the driveshaft sections above the transmission to expel the heated air from exhaust vents that populate an upper perimeter of the housing.

5. The wind turbine of claim 1, wherein the frame structure is elongated between two opposite ends, further comprising:
two telescoping towers each located closer to respective ones of the two opposite ends of the frame structure than to remaining ones of the two opposite ends of the frame structure;
means for making an adjustment of an overall height reached by the telescoping towers; and
means for elevating the frame structure to an elevation reached from the adjustment made, said two telescoping towers both cooperatively supporting and elevating the frame structure.

6. The wind turbine of claim 1, further comprising:
self-cleaning photovoltaic panels that generate electricity, wherein the frame structure includes a solar panel support frame that supports the self-cleaning photovoltaic panels; and
an axial member from which extends each of the helical swept airfoils beneath an underside of said solar panel support frame, the axial member and the solar panel support frame being arranged and configured so that the solar panel support frame rotates in unison with rotation of the axial member and therefore in unison with rotation of the helical swept airfoils, the self-cleaning photovoltaic panels rotating in unison with rotation of the solar panel support frame by the axial member and rotating at an elevation lower than that of the solar panel support frame with the axial member oriented in an upright, erect orientation.

7. The wind turbine of claim 6, further comprising:
a converging support that converges from the axial member to the frame structure; cables or wires extending from the solar voltaic collector toward the frame structure via the converging support.

8. A wind turbine, comprising:
a frame structure;
a rotary airfoil assembly supported by said frame structure, said rotary airfoil assembly including helical swept airfoils that rotate to capture wind throughout a circumference of the rotary airfoil assembly from both windward and leeward sides;
permanent magnet disc means for levitating static weight of an entirety of the rotary airfoil assembly via magnetic repulsion;
hub means for affixing said permanent magnet disc means within said frame structure in a manner that counteracts both a coefficient of friction ("COF") associated with rotation of the rotary airfoil assembly and ensuing bearing wear imparted from the rotary airfoil assembly;
electricity generating means for generating electricity in response to rotation of the helical swept airfoils;
at least one component movable between deployed and retracted positions; and
responsive means that is responsive to a bias force imparted from a spring-loaded, extendable hinge mechanism and from a rotating induced centrifugal force imparted to rotating eccentric cams that overcomes the bias force for moving the at least one component between deployed and retracted positions.

9. The wind turbine of claim 8, wherein the at least one component is a leading edge slat connected to a leading edge side of said helical swept airfoils in a manner that enables the leading edge slat to move between the deployed and retracted positions, the responsive means moving the leading edge slat from the retracted to the deployed position as the rotating induced centrifugal force imparted to the rotating eccentric cams overcomes the bias force from the spring-loaded, extendable hinge mechanism, the responsive means moving the leading edge slat from the deployed position to the retracted position due to the bias force from the spring-loaded, extendable hinge mechanism no longer being overcome by the rotating induced centrifugal force.

10. The wind turbine of claim 8, wherein the at least one component is a trailing edge flap connected to a trailing edge side of said helical swept airfoils in a manner that enables the trailing edge flap to move between the deployed and retracted positions, the responsive means moving the trailing edge flap from the retracted to the deployed position as the rotating induced centrifugal force imparted to the rotating eccentric cams overcomes the bias force from the spring-loaded, extendable hinge mechanism, the responsive means moving the trailing edge flap from the deployed position to the retracted position due to the bias force from the spring-loaded, extendable hinge mechanism no longer being overcome by the rotating induced centrifugal force.

11. The wind turbine of claim 8, wherein the at least one component is a boundary layer spoiler arranged to provide aerodynamic deterrent in over-speed situations in the deployed position, the responsive means moving the boundary layer spoiler from the deployed to the retracted position as the rotating induced centrifugal force imparted to the rotating eccentric cams overcomes the bias force from the spring-loaded, extendable hinge mechanism, the responsive means moving the boundary layer spoiler from the retracted position to the deployed position due to the bias force from the spring-loaded, extendable hinge mechanism no longer being overcome by the rotating induced centrifugal force.

12. A wind turbine, comprising:
a frame structure;
a rotary airfoil assembly supported by said frame structure, said rotary airfoil assembly including helical swept airfoils that rotate to capture wind throughout a circumference of the rotary airfoil assembly from both windward and leeward sides;
permanent magnet disc means for levitating static weight of an entirety of the rotary airfoil assembly via magnetic repulsion;
hub means for affixing said permanent magnet disc means within said frame structure in a manner that counteracts both a coefficient of friction ("COF") associated with rotation of the rotary airfoil assembly and ensuing bearing wear imparted from the rotary airfoil assembly; and electricity generating means for generating electricity in response to rotation of the helical swept airfoils, said electricity generating means including a plurality of alternators arranged in a stack with driveshaft sections that is segregated by magnetic clutches that engage and disengage the alternators in response to electrical load and kinetic energy availability without utilization of pulleys, idlers, pillow blocks, or drive belts.

13. A wind turbine, comprising:
a frame structure;
a rotary airfoil assembly supported by said frame structure, said rotary airfoil assembly including helical swept airfoils that rotate to capture wind throughout a circumference of the rotary airfoil assembly from both windward and leeward sides;
permanent magnet disc means for levitating static weight of an entirety of the rotary airfoil assembly via magnetic repulsion;
hub means for affixing said permanent magnet disc means within said frame structure in a manner that counteracts both a coefficient of friction ("COF") associated with rotation of the rotary airfoil assembly and ensuing bearing wear imparted from the rotary airfoil assembly;
electricity generating means for generating electricity in response to rotation of the helical swept airfoils, said electricity generating means includes at least one alternator on an alternator drive shaft; and
an electronic control module (ECM) responsive to sensed inputs for issuing commands; and
a multi-speed transmission responsive to said commands for varying a speed of rotation of said driveshaft sections accordingly under hydraulic speed control, the multi-speed transmission also including means for providing the hydraulic speed control via regulation of flow from a hydraulic pump, said hydraulic speed control providing protection in response to further ones of the commands against reaching wind gust generated over-speed conditions that arise from excessive rotation of the rotary airfoil assembly by lowering a rotational speed of or stopping rotation of said driveshaft sections.

14. The wind turbine electricity generator of claim 13, further comprising:
a plurality of sensors that provide the sensed inputs, the plurality of sensors being configured to measure direction, motion, velocity, acceleration, shaft speed, vibration, temperature, pressure, humidity, wind speed, and wind gusts.

15. The wind turbine electricity generator of claim 13, wherein said multi-speed transmission includes a variable flow aperture having a controller responsive to the issued commands to vary flow from the hydraulic pump.

16. The wind turbine electricity generator of claim 13, further comprising:
means for powering a magnetic disc clutch or drum clutch in response to said commands to effect engagement of the driveshaft sections;
means for powering a magnetic dog clutch responsive to said commands to effect a mechanical lock or link between the driveshaft sections and thereafter shutting off power to the magnetic disc clutch or drum clutch to disengage; and
means for shutting off power to the magnetic dog clutch in response to said commands.

17. The wind turbine electricity generator of claim 13, further comprising:
a magneto-rheological fluid mount, the ECM being configured to be responsive to sensed inputs from the sensors to ascertain rotary airfoil torque and for monitoring electrical production and for modulating direct current to an alternating current inverter and for converting accelerometer inputs to modulate the magneto-rheological fluid mount.

18. The wind turbine electricity generator of claim 13, wherein the at least one alternator includes a plurality of alternators arranged in a stack on the driveshaft sections, the plurality of alternators being segregated from each other by magnetic clutches that engage and disengage the alternators in accord with electrical load and kinetic energy availability.

19. A wind turbine electricity generator, comprising:
a frame structure;
a rotary airfoil assembly supported by said frame structure, said rotary airfoil assembly being arranged to rotate in response to wind forces;
electricity generating means for generating electricity in response to rotation of the rotary airfoil assembly, said electricity generating means including at least one alternator on one of a plurality of driveshaft sections stacked one over the other in succession;
an electronic control module (ECM) responsive to sensed inputs for issuing commands; and
a multi-speed transmission responsive to said commands for varying a speed of rotation of said driveshaft sections of a main shaft accordingly under hydraulic speed control, the multi-speed transmission also including means for providing the hydraulic speed control via regulation of flow from a hydraulic pump, said hydraulic speed control providing protection in response to further ones of the commands against reaching wind gust generated over-speed conditions that arise from excessive rotation of the rotary airfoil assembly by lowering a rotational speed of or stopping rotation of said driveshaft sections.

20. The wind turbine electricity generator of claim 19, further comprising:
a plurality of sensors that provide the sensed inputs, the plurality of sensors being configured to measure direction, motion, velocity, acceleration, shaft speed, vibration, temperature, pressure, humidity, wind speed, and wind gusts.

21. The wind turbine electricity generator of claim 20, wherein said multi-speed transmission includes a variable flow aperture having a controller responsive to the issued commands to vary flow from the hydraulic pump.

22. The wind turbine electricity generator of claim 19, further comprising:
means for powering a magnetic disc clutch or drum clutch in response to said commands to effect engagement of the driveshaft sections;
means for powering a magnetic dog clutch responsive to said commands to effect a mechanical lock or link between the driveshaft sections and thereafter shutting off power to the magnetic disc clutch or drum clutch to disengage; and
means for shutting off power to the magnetic dog clutch in response to said commands.

23. The wind turbine electricity generator of claim 19, further comprising:
a magneto-rheological fluid mount, the ECM being configured to be responsive to sensed inputs from the sensors to ascertain rotary airfoil torque and for monitoring electrical production and for modulating direct current to an alternating current inverter and for converting accelerometer inputs to modulate the magnetorheological fluid mount.

24. The wind turbine electricity generator of claim 19, wherein the at least one alternator includes a plurality of alternators arranged in a stack on the alternator driveshaft, the plurality of alternators being segregated from each other by magnetic clutches that engage and disengage the alternators in accord with electrical load and kinetic energy availability.

25. The wind turbine electricity generator of claim 19, wherein the multi-speed transmission includes transmission gears, means for rotating the transmission gears in air to eliminate surface friction parasitic drag that otherwise arises from rotation of the transmission gears on a surface, and means for imparting a counteracting torque load on the main shaft.

\* \* \* \* \*